Jan. 22, 1963  W. A. DERR ET AL  3,075,177
SUPERVISORY CONTROL SYSTEM
Original Filed Oct. 10, 1956  22 Sheets-Sheet 1

Fig. 1.

| Enumeration or Indication Signals | Code Combinations | Check Signals | Total Signals |
|---|---|---|---|
| 2 | 4 | 3 | 5 |
| 3 | 8 | 3 | 6 |
| 4 | 16 | 3 | 7 |
| 5 | 32 | 4 | 9 |
| 6 | 64 | 4 | 10 |
| 7 | 128 | 4 | 11 |
| 8 | 256 | 4 | 12 |
| 9 | 512 | 4 | 13 |
| 10 | 1024 | 4 | 14 |
| 11 | 2048 | 4 | 15 |
| 12 | 4096 | 5 | 16 |
| 13 | 8192 | 5 | 17 |

Fig. 2.

| Control Check Pattern | | | | | | | |
|---|---|---|---|---|---|---|---|
| Check Pulses | Enumeration Signals | | | Check Signals | | | Total of Signals (1) |
| | 1st | 2nd | 3rd | X1 | X2 | X3 | |
| X1 | | + | + | + | | | Odd |
| X2 | + | | + | | + | | Odd |
| X3 | + | + | | | | + | Odd |

Fig. 3.

| Control Code | | | | | | | |
|---|---|---|---|---|---|---|---|
| Code Number | Enumeration Signals | | | Check Signals | | | |
| | 1st | 2nd | 3rd | X1 | X2 | X3 | |
| 1 | 1 | 2 | 2 | 1 | 2 | 2 | |
| 2 | 2 | 1 | 2 | 2 | 1 | 2 | |
| 3 | 1 | 1 | 2 | 2 | 2 | 1 | |
| 4 | 2 | 2 | 1 | 2 | 2 | 1 | |
| 5 | 1 | 2 | 1 | 2 | 1 | 2 | |
| 6 | 2 | 1 | 1 | 1 | 2 | 2 | |
| 7 | 1 | 1 | 1 | 1 | 1 | 1 | |
| 8 | 2 | 2 | 2 | 1 | 1 | 1 | |

Fig. 4.

| Indication Check Pattern | | | | | | | | |
|---|---|---|---|---|---|---|---|---|
| Check Pulses | Indication Signals | | | | Check Signals | | | Total of Signals (1) |
| | 1st | 2nd | 3rd | 4th | X1 | X2 | X3 | |
| X1 | | + | + | + | + | | | Even |
| X2 | + | | + | + | | + | | Even |
| X3 | + | + | | + | | | + | Even |

INVENTORS
Willard A. Derr &
Sheldon D. Silliman.
BY Francis V.B. Giolma
ATTORNEY Jan. 22, 1963   W. A. DERR ET AL   3,075,177
SUPERVISORY CONTROL SYSTEM
Original Filed Oct. 10, 1956   22 Sheets-Sheet 11

• Auxiliary Switch Open When Circuit Breaker Main Contacts Are Open. See Fig. 7D.

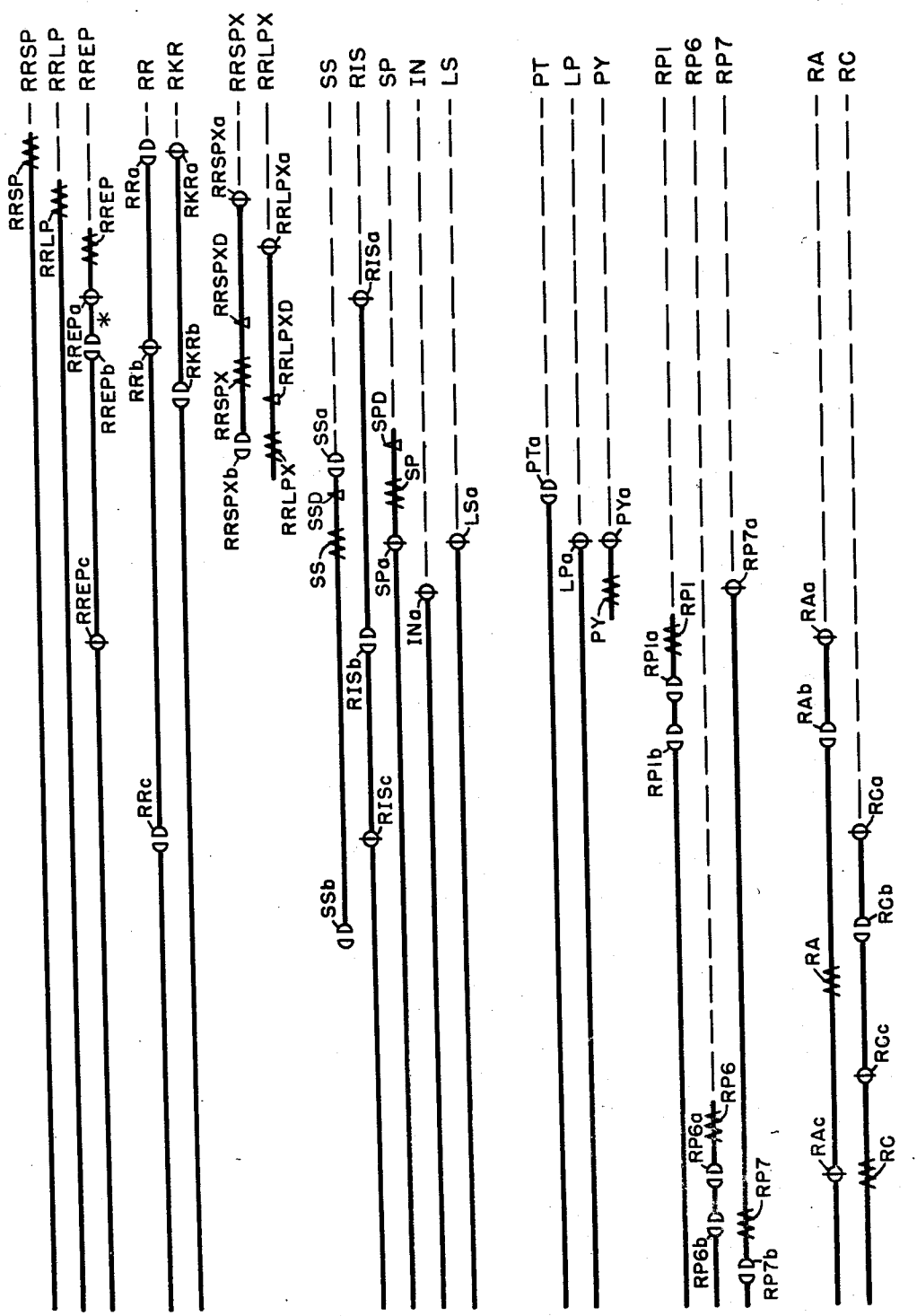
Fig. 8A.   * Make Before Break

United States Patent Office 3,075,177
Patented Jan. 22, 1963

3,075,177
SUPERVISORY CONTROL SYSTEM
Willard A. Derr, Forest Hills, and Sheldon D. Silliman, Pittsburgh, Pa., assignors to Westinghouse Electric Corporation, East Pittsburgh, Pa., a corporation of Pennsylvania
Continuation of application Ser. No. 615,124, Oct. 10, 1956. This application Dec. 12, 1960, Ser. No. 75,448
15 Claims. (Cl. 340—163)

Our invention relates to remote control apparatus, and it has reference in particular to supervisory control systems.

This is a continuation of copending application Serial No. 615,124, filed on October 10, 1956, now abandoned.

Generally stated, it is an object of our invention to provide an improved self-checking supervisory control system which is simple and inexpensive to build and is reliable in operation.

More specifically, it is an object of our invention to provide in a supervisory control system for using in selection-control codes, each comprising a predetermined total number of operating signals of different types and having a predetermined number of check signals added thereto, such that each check signal combined with a different predetermined group of the operating signals provides a combination having an odd or an even number of one type of signal.

Another object of our invention is to provide in a remote control system for sequentially checking the positions of a number of devices at a remote station and for transmitting signals corresponding to the operating positions thereof together with a predetermined number of check signals which are selected so as to make the total signals of one kind in a group when a check signal is combined with different predetermined groups of the indication signals, either odd or even.

Yet another object of our invention is to provide in a supervisory control system for sending a binary operating code comprising a predetermined number of signals of two different kinds, and following the operating code with a check code in which successive signals are of the one kind or the other as is required top rovide a predetermined check pattern when each check signal is combined with a particular group of the control code signals.

It is another object of our invention to provide in a self-checking supervisory control system for utilizing a change of position of a device to send consecutive signals indicating the positions of each of the devices at the remote station, and following these signals with a plurality of check pulses which are dependent on the relative positions of different groups of the devices.

Another important object of our invention is to provide in a remote control system for automatically reporting on the positions of all apparatus at a remote station when a change in position of one piece of apparatus occurs, and for including in such report changes in apparatus occurring between the time the report is commenced and before the particular apparatus has been checked, while starting another scanning operation to report changes in the position of apparatus occurring while the previous scanning operation was being performed but after the particular apparatus had been checked.

Yet another important object of our invention is to provide in a supervisory control system for transmitting directly a single selection-control code for selecting and effecting operation of a particular piece of remote apparatus in one operation.

It is also an object of our invention to provide in a supervisory control system for using a single counting means for effecting a predetermined number of operations of a sending relay in transmitting an operating code of a fixed number of signals of different kinds followed by a predetermined number of check pulses and for selectively determining the nature of certain of the operation code pulses and check pulses to provide a predetermined relation between different groups of the operation code signals and particular ones of the check pulse signals.

Other objects will, in part, be obvious and will, in part, be explained hereinafter.

In practicing our invention in accordance with one of its embodiments, a pulse sending relay at a dispatching office is selectively controlled by short and long pulse control relays in conjunction with a plurality of counting relays to send selection-operating codes for selecting and operating apparatus at a remote station. Each selection-operating code comprises three control pulses and three check pulses for eight control operations, the length of each pulse being determined by operation relays which set up circuits for providing definite combinations of long and short pulses for the control pulses, and then determining the characteristics of the check pulses, so that each check pulse when combined with a different pair of the control pulses produces a combination in which the number of long pulses is odd.

At the remote station, the pulses are received and checked to determine the validity of the particular code and circuits are then set up to perform the described operation.

If a circuit breaker opens automatically at the remote station a long indication set up pulse is transmitted from the remote station to condition the dispatching office for receiving a check on the position of each of the breakers in sequence. Long or short pulses are then transmitted one for each breaker depending on the breaker position to operate indicating lamp relays at the dispatching office accordingly. The indication code includes three check pulses, which are respectively long or short so as to make the total number of long pulses in the combination of each check pulse with different groups of the indication pulses even. The validity of the over-all code is checked by a check circuit at the dispatching office before operating any of the indicating relays.

For a more complete understanding of the nature and scope of our invention reference may be made to the following detailed description which may be read in connection with the accompanying drawings, in which:

FIGURE 1 is a tabulation of the number of enumeration signals and check signals in different code combinations;

FIG. 2 is a tabulation showing the check signal pattern for three enumeration pulses in different code combinations;

FIG. 3 is a chart showing the eight control code combinations;

FIG. 4 is a tabulation showing the check signal pattern for four indication signals in indication codes;

FIGS. 5A through 5E placed one below the other in order are schematic diagrams of the dispatching office supervisory control equipment;

FIGS. 6A through 6E placed one below the other are relay stem diagrams for typical ones of the relays of FIGS. 5A through 5E, respectively;

FIGS. 7A through 7E placed one below the other in order are schematic diagrams of the remote station supervisory control equipment; and FIGS. 8A through 8E placed one below the other are stem diagrams of typical ones of the relays of FIGS. 7A through 7E, respectively.

Figure 1A:
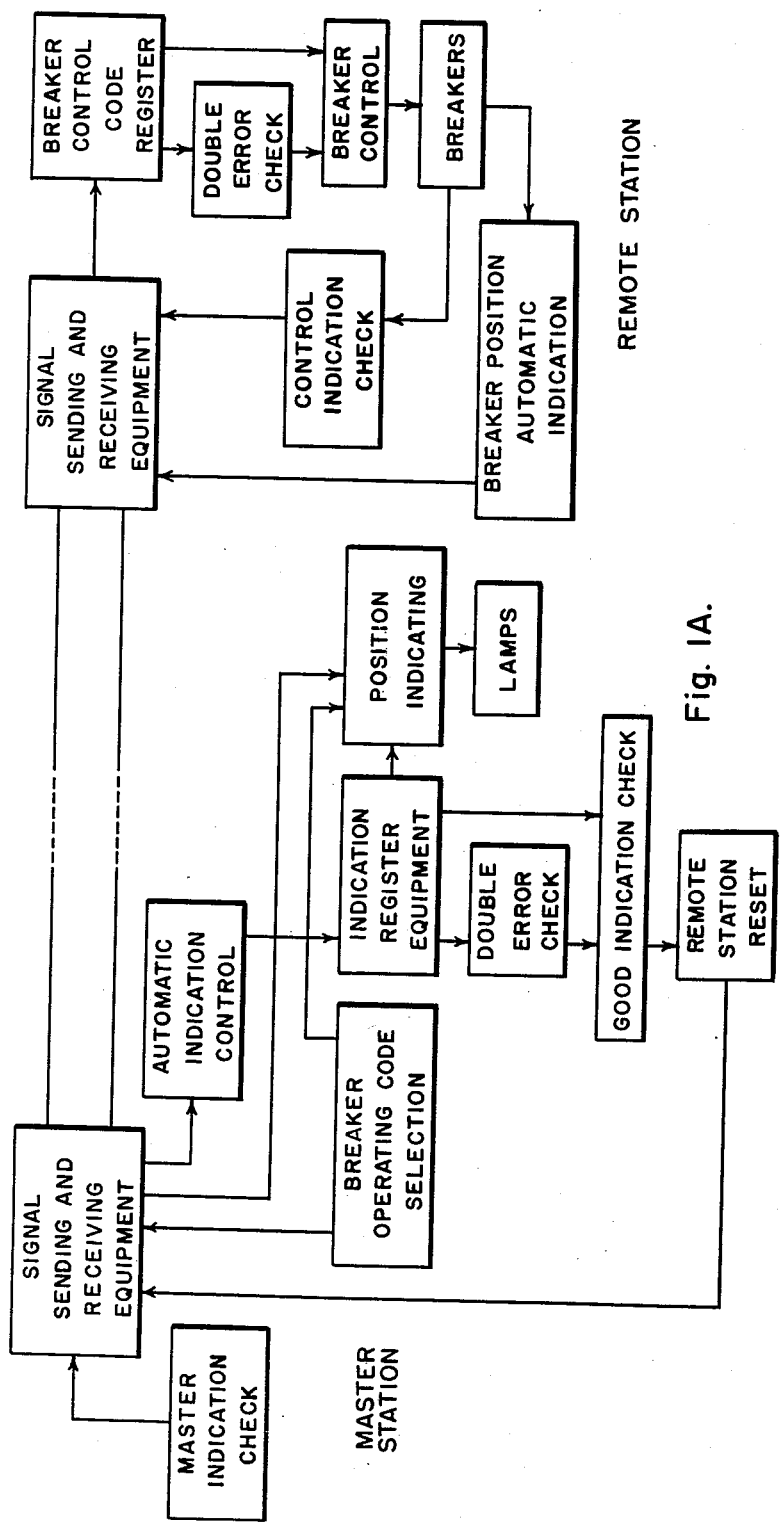
FIG. 1A is a block diagram of the supervisory control system at the dispatch office and the remote station.

The supervisory control system shown in block form in FIG. 1A and shown schematically in FIGS. 5A through 5E and 7A through 7E is a self-checking system providing selective control and automatic indication of remotely located units by means of coded signals over a single transmission channel. The combined selection-control code uses a binary system, as does the indication scanning code for determining the operating position of the remote units. Both the control and indication codes have a self-checking feature which can be used to detect single and double errors during code sending and receiving. The control codes, as shown in FIG. 3, each comprise a total of six signals—three for selection-control and three for checking. The different number of possible codes for a given number of signals follows the binary expression $X=2^n$, where X equals the number of code combinations, and $n$ equals the number of enumeration signals. Check signals are added to the selection-control enumeration signals in a pattern that will permit each code to be checked for double errors.

In a binary signal system the total number of pulses or signals required to make a code double-error detecting is based on comparing each enumeration pulse or signal with two different check signals, and follows the binary expression $2^n-1$, where $n$ equals the number of check pulses or signals. The number of available enumeration signals or pulses on this basis is $2^n-(1+n)$ as shown in the table of FIG. 1.

A binary system is one which uses two signals of different characteristics, which may be designated as signal (1) and signal (2). These signals may as described hereinafter comprise a signal (1) and the absence of a signal (0), long and short-pulses, signals of + or − polarity, pulses of two different frequencies such as $F_1$ and $F_2$, or even pulses of different amplitudes.

The pattern of check signals is largely a matter of the designers choice with the enumeration and check signals occurring in any order. The primary function in the present application being one of checking a presumably valid code, it is advantageous to send the enumeration signals first and have the basic circuitry set up before making the check, the primary function being that each enumeration signal be checked twice. This is accomplished by combining the enumeration signals in groups with the check signals so that each enumeration signal is compared with two of the check signals.

For the system to be described, since only eight different codes are necessary to open and close four different circuit breakers, a fixed number of signals comprising three enumeration signals and three check signals are used. Basically, two different signals are used and each check signal is made either signal (1) or signal (2) so that the total (1) or (2) signals for a particular check is either odd or even. For the coding arrangement having three enumeration and three check signals as in the control code, each check signal is selected to make the total of (1) signals odd. For a coding arrangement having four enumeration signals and three check signals as in the indication code, each check may be even. When a code having three check signals is received and one of the enumeration signals is in error, two of the check signals will detect a single error. If two of the enumeration signals are in error one of the check signals will detect the double error. This can be readily demonstrated by reversing any two signals (either enumeration or check) of a particular control code and applying the X1, X2 and X3 check signals.

The indication check system is tabulated in FIG. 4 and the same basic checking principles are used. If the unit being supervised requires a red lamp indication a (1) signal is used; if a green lamp indication is required, a (2) signal is used. As herein used, the (1) and (2) designation for signals represent long and short pulses respectively. It should be noted that (1) and (2) could indicate other binary signaling systems. For example, two transmission channels could be used, one for (1) signals and one for (2) signals. Yet another system could be the telegraphic simplex printer method in which the sending and receiving signals run in synchronism and the presence of a signal represents (1) and the absence of a signal represents (2). Yet still another method would be to use a single pair of line wires and reverse the polarity of the D.-C. applied to the line wires to signify (+) and (−) pulses. FIGURE 1 lists the number of enumeration or indication pulses for different number of check pulses.

In a binary signal system either signal may be checked, and the check signal for each group of enumeration signals may be selected so as to make the total of such group of signals either odd or even. As shown in FIG. 2 the check signal X1 is compared with the second and third enumeration signals and is made (1) or (2) in order to make the total signals (1) odd. Likewise check signal X2 is compared with the first and third enumeration signals and check signal X3 is compared with the first and second enumeration signals. In this manner each enumeration signal is compared with two check signals.

In control code #4 as shown in FIG. 3 the enumeration signals are respectively (2), (2), (1). The first check signal X1 is therefore made 2, the second X2 is made 2 and the third X3 is made 1 in order to make the total of signals 1 in each group odd.

The indication pattern is similarly ascertained although for purposes of illustration the total of signals (1) has been made even. For example, as shown in FIG. 4 check signal X1 is compared with the second third and fourth indication signals; X2 is compared with the first third and fourth enumeration signals; and X3 is compared with the first second and fourth enumeration pulses. In each instance the check signal is made (1) or (2) so as to make the total of signals (1) in each group even. Each indication signal is thus checked with two check signals and double errors may be detected.

Referring to FIGS. 5A through 5E, it will be seen that four selection switches SW1 through SW4 are provided for selecting and either closing or tripping their respective circuit breakers CB1 through CB4 at the remote station. These switches, in combination with associated operation buttons OP1 through OP4, provide control circuits for operating relays O1 through O8 to determine the operating position of coding control relays K1 through K6 which determine the length of the different pulses to be transmitted in a code. A control start relay CS is provided for initiating the operation of a pulse sending delay relay DSP and a pulse control delay relay DSS which effects operation of a keying relay KR to sequentially energize the line conductors L1 and L2 for transmitting coded pulse signals to the remote station, and connect a resistor $r$ in series with a receiving relay R, having a resistance equal to that of the line conductors. Operation of the pulse relay DSP is controlled by a pulsing stop relay Y which, in turn, is controlled by counting means comprising a plurality of relays P1 through P8 which operate as a counting chain in conjunction with sequence relays A, B and C. A long pulse delay control relay DLP is provided for controlling the operation of the keying relay KR during predetermined ones of its operation as determined by the operation positions of the coding control relays K1 through K6 to provide for sending long pulses in different ones of the signal positions depending on which ones of the coding control relays are energized. A timing relay CT is used to time the response of apparatus at a remote station for the purpose of indicating an incomplete operation.

At the remote station a receiving relay RR is connected to the line conductors L1 and L2 to be energized in accordance with the coded signals transmitted from the dispatching office by the keying relay KR. Operation of the receiving relay RR effects operation of a short pulse receiving relay RRSP and a long pulse receiving relay RRLP depending on whether the pulse is short or long. Auxiliary delay relays RRSPX and RRLPX operate in conjunction with their respective relays RRSP and RRLP. A counting chain comprising a plurality of counting relays RP1 through RP7 are operated by the receiving relay RR in conjunction with the sequence relays RA, RB and RC to count the pulses received.

A plurality of control code register and check relays RC1 through RC6 and check signal relays RCX1 through RCX3 are provided for operating in conjunction with counting relays RP1–RP6 and relays RRLP and RRSP for checking the code received from the dispatching office. The code register relays RC1 through RC6 have both a main operating winding and a neutralizing winding indicated by the suffix N. Operation of the long pulse receiving relays RRLP provides an energizing circuit for operating the register relays in sequence, while the short pulse receiving relay RRSP shunts the main winding to drop the register relay and determine its position. The check relays RCX1 through RCX3 are provided with operating circuits including contacts of the register relays RC2 and RC3, RC3 and RC1, and RC1 and RC2, respectively. A code checking relay CY is controlled by the check relays and the counting relay RP7 so as to operate only if a valid code is received. A plurality of control relays 1 through 8 are provided for respectively closing and tripping the four circuit breakers at the remote station. The operation of these control relays is determined by the first three pulses transmitted in the code which determined the respective operating positions of the code register relays RC1 through RC3. Operation of the valid code check relay CY completes the operating circuit set up by the register relays. Relay REP is provided for responding to an extra long pulse when a master check is desired.

At the remote station a plurality of alarm register relays RG1 through RG4 are provided in conjunction with their respective circuit breakers for indicating a change in the position of their respective breakers CB1 through CB4. Control impulse relays C1S and C1L are provided in conjunction with a delay relay LS and pulse control relays CSP and CLP for sending an indication pulse in response to a control operation.

An indication detection relay IR in conjunction with an indication start auxiliary relay ISX is controlled by the register relays RG1 through RG4 to effect transmission of a breaker position code upon the change in position of any one of the breakers. An indication start relay RIS operates in conjunction with the relay ISX and an extra long pulse delay relay to effect operation of a keying relay RKR for energizing the line conductors L1 and and L2 to transmit coded signals indicating the positions of the different circuit breakers. Operation of the keying relay RKR is controlled by a pulse sending delay relay SP and a pulse control delay relay SS which operates in conjunction with the counting relays RP1 through RP7 to transmit a code of four indication pulses and three check pulses. A long pulse delay relay LP is provided for determining which of the pulses transmitted is long. This relay is controlled jointly by the counting relays RP1 through RP7 and the register relays RG1 through RG4 and the check relays RGX5 through RGX7. A pulse stopping relay RPY operates in conjunction with the counting relays to stop operation of the keying relay at the end of the seven pulses.

At the dispatching office, the receiving relay R operates in response to the pulses transmitted from the remote station to operate long and short receiving relays RSP and RLP in conjunction with auxiliary relays RSPX and RLPX. An indication start control relay IS is provided for responding to an extra long pulse to effect operation of the counting relays P1 through P8 to operate in response to the code received from the remote station. The pulse receiving relays RSP and RLP determine the operating position of indictaion and indication check relays C1 through C7 and CX1 through CX3 in accordance with whether the pulses are long or short. The red and green lamps R1 through R4 and G1 through G4 are provided in conjunction with the circuit breaker positions and are controlled by the indication relays C1 through C4 to indicate whether the respective breakers are opened or closed. A good indication check relay IG is controlled by the indication check relays and in conjunction with an auxiliary relay IGX operates keying relay KR to send a single check pulse. A bad check relay IX and a bad check reset relay IY are provided for determining whether a code is valid. Operation of relay IY is controlled by indication check relay IG which operates under the control of the check relays CX1 and CX3. Disagreement relays D1 through D4 controlled by the switches SW1 through SW4 and the indication relays C1 through C4, are utilized to operate lamp flashing relays DX and DY to cause flashing of the red and green lamps whenever the breaker position disagrees with the position of the control switch. An alarm relay DZ is provided for sounding an alarm bell B when such disagreement occurs and lighting an alarm lamp L. An alarm reset relay AR is provided for extinguishing the lamp and turning off the alarm upon the operation of a reset push button RS. An indication stop relay 1N at the remote station responds to the check pulse from the dispatching office, and in conjunction with a timing delay relay PT operates to release the start relay IS and reset the equipment. A master check relay M and auxiliary relay MX are provided at the dispatching office for initiating an indication check.

If the dispatcher desires to close the circuit breaker CB2 the toggle switch SW2 is moved from the green lamp or open position as shown, to the red lamp or close position. Because the toggle switch does not agree with the lamp indication, the green lamp is flashed and the alarm lamp L is lighted and the alarm bell sounded. The operate pushbutton OP2 is momentarily pushed. The flashing green lamp G2 is extinguished, the alarm lamp L is extinguished and the alarm bell B is silenced. Control code No. 3 (close for breaker CB2) is transmitted to the remote station where the code is registered and checked. If the registered code is correct, operation relay 3 is energized. Breaker CB2 closes and closes the breaker alarm switch CB2. A single long pulse is sent from the remote station to the dispatching office where the red lamp R2 is lighted. If the registered code is incorrect, the equipment stops functioning and, after a short time delay, the disptaching office control abnormal lamp LL is lighted to inform the dispatcher. Pushing the reset key will extinguish the control abnormal lamp. The green lamp G2 will flash, indicating to the dispatcher that the control operate pushbutton OP2 can be operated again.

To trip breaker CB2 the procedure is similar to that described above. The toggle switch SW2 is moved from the red to the green lamp position causing the red lamp R2 to flash and control code No. 4 to be transmitted to the substation. When the breaker trips, the alarm switch contact CB2a opens and a single short pulse is transmitted to the office where the green lamp G2 is lighted. If the trip operation is abnormal the system functions in the same manner as described above for the abnormal close operation.

For an automatic breaker operation, breaker alarm switch of the breaker opening causes the remote station equipment to send a code consisting of an extra long start pulse, and four indication and three check pulses. The lamps at the dispatching office are lighted in accordance with the four indication pulses. Any lamps that do not agree with the position of the toggle swtiches are flashed and the alarm is sounded. The indication code is checked and if correct, a single short pulse is sent to the remote station and the equipment returns to normal. The dispatcher can cause a flashing lamp or lamps to burn steady by moving the corresponding toggle switches to agree with the lamp indication. This action will automatically cause the alarm lamp to be extinguished and the alarm bell to be silenced. If the dispatcher desires to retain the flashing lamp but silence the bell and extinguish the alarm lamp, he pushes the reset button. It should be noted that each time a remote alarm switch changes position, all lamp indications are checked.

The master check operation in which all lamp indications are checked is as described above. The master pushbutton M at the dispatching office is momentarily pushed and in conjunction with the master auxiliary relay MX, the keying relay KR is operated to send an extra long pulse to the remote station wherein the indication code transmission is started.

For a detailed description of operation reference may be made to FIGS. 5A through 5E. The dispatching office relays CT, CNX, IX, IGX, MX, RSPX and RLPX are normally energized when the equipment is at rest. The indication relays C1 through C4 will be energized with the main and neutralizing coils in a series if the green lamps G1 through G4 are lighted indicating that the circuit breaker at the remote station is open. If a circuit breaker is closed, as will be assumed in the present instance, its corresponding red lamp will be energized, which means that the corresponding C relays are deenergized. At the remote station relays PT, PY, RRSPX, RRLPX, ISY and RG1 through RG4 will be energized. These relays are shown in FIGS. 7A through 7E of the drawings.

If the dispatcher desires to trip breaker CB2, the toggle switch SW2 for this breaker is operated from the position shown to the trip position. This provides an energizing circuit for the disagreement relay D2 through contact C2j and contact SW2f. This effects operation of relay D2 and provides an operating circuit for the flashing lamp relays DX and DY through contact D2c, so that relay DX energizes, completing the circut for relay DY through contact DXa, which interrupts the circuit for relay DX at contact DYb. A flashing circuit is thus provided for the red lamp R2 through contact C2g, contacts O4f, O3g, contact D2b and contact DYa. The alarm control relay DZ is also energized through contact D2c, causing the alarm bell B to sound and alarm lamp L to light.

As soon as the dispatcher pushes the operate key OP2 an energizing circuit is provided for the operate relay O4 extending through contact SW2b and switch OP2, contact O2a, contact O1b, contact CSa, contact CNXa, contact Ma, contact ISa, and contact RSa of the reset switch RS. Relay O4 operates, interrupting the circuit for the red lamp R2 at contact O4f, and providing energizing circuits for the coding relays K3 and K6 through contacts O4c and O4d. At the same time, an energizing circuit is provided for the control start relay CS through the contacts K3a and K6a. For control code No. 4, long pulses are to be transmitted for the third and sixth pulses. With the control code relays K3 and K6 being energized, their corresponding pulses will be long. A break contact CSk of relay CS opens the circuit to the alarm bell B and the alarm lamp L to automatically deenergize the alarm.

A make contact CSb of relay CS prepares the circuit to the pulse control relays [P1 to P8, A, B, and C] and the pulse sending circuits including relays [Y, DSS, DSP and DLP]. Relay Y is energized immediately through this contact and a contact Ya causes the relay DSS to operate to effect energization of counting relay P1 through contact DSSa and effects operation of the pulsing relay DSP through contact DSSB. A contact DSPa of relay DSP energizes the keying relay KR to apply positive and negative to the line wire conductors L1, L2 through contacts KRd and KRc. A make contact DSPb of relay DSP prepares a circuit for the long pulse relay DLP. However, since coding relay K1 is not operated, the circuit is not completed and relay DLP does not operate. The keying relay KR energizes the receiving relay R through contacts KRc, KRd and a break contact Ra of relay R opens the circuit of relay DSS. When relay DSS releases, contact DSSa opens and relay A is energized in series with relay P1 and relay DSP is released. Release of DSP releases the keying relay KR and the receiving relay R. Release of relay R completes a circuit at contact Ra for picking up relay DSS, which provides an energizing circuit for relay DSP at contact DSSb. This completes the transmission of the first pulse. Pulse 2 is similarly transmitted except that relays P2 and B are operated and relays A and P1 are released.

The transmission of the third pulse is similar to that described above, except that a long pulse rather than a short pulse is transmitted. After relays DSS operate and relays P3 and DSP are energized, the circuit to relay DLP is completed through contacts K3b and P3c. A contact DLPa of the relay DLP connected in parallel with contact DSPa of relay DSP is used for energizing the keying relay KR. After the break contact Ra of relay R opens the circuit to relay DSS relay C is energized to open the circuit to relay DLP at contact Cd. Relays B and P2 are released and after a short delay, relay DLP is completely released permitting relay DSS to be energized for the starting of the next pulse. Pulsing continues with the fourth and fifth pulses being short and the sixth pulse being long because of a circuit being provided for relay DLP through contact K6d. When the pulse control relay P6 operates, relay Y is released by the opening of contact P6c to stop the pulsing circuit so that only six pulses are transmitted. A break contact of relay P6, namely P6e, interrupts the energizing circuit for the timing relay CT and a make contact P6f prepares the circuit to relay CN.

Referring to FIGS. 7A through 7E, which show the remote station apparatus, it will be seen that each pulse received at the remote station operates the receiving relay RR. A make contact RRa provides an energizing circuit for relay RRSP, and a make contact RRC provides an energizing circuit for the counting relay RP1, while a break contact RRb deenergizes relay RRSPX. With relay RP1 energized, the circuit to the upper or main coil of RC1, is completed through contact RP1c. Relay RC1 operates; however, if relay RRSPX is completely released to energize relay RRLP before the receiving relay RR is released, a shunt will be provided about the main coil RC1 through contact RRLPa and relay RC1 will be deenergized. For control code No. 4, the first pulse is short causing relay RRSPX to be energized before relay RRLP is operated and relay RC1 is therefore energized. Release of relay RR causes relay RA to be energized in series with relay RP1. The equipment operates in a like manner for the second pulse except that relays RP2 and RB are operated, relays RA and RP1 are released and relay RC2 is operated. The next four pulses are registered with relays RC3 and RC6 being released, because of the third and sixth pulses being long, and relays RC4 and RC5 operated.

Figure 5A:
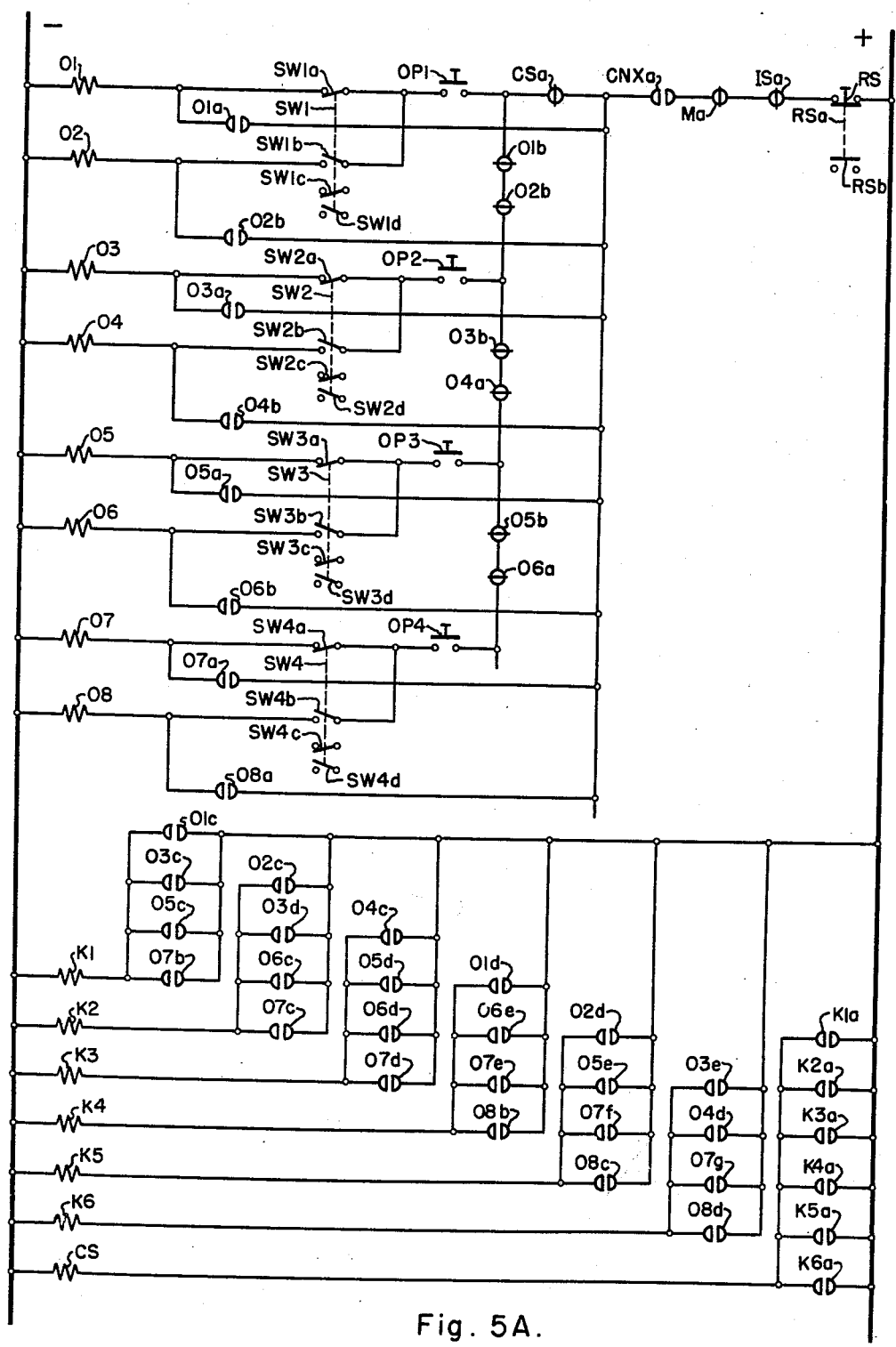
Figure 5B:
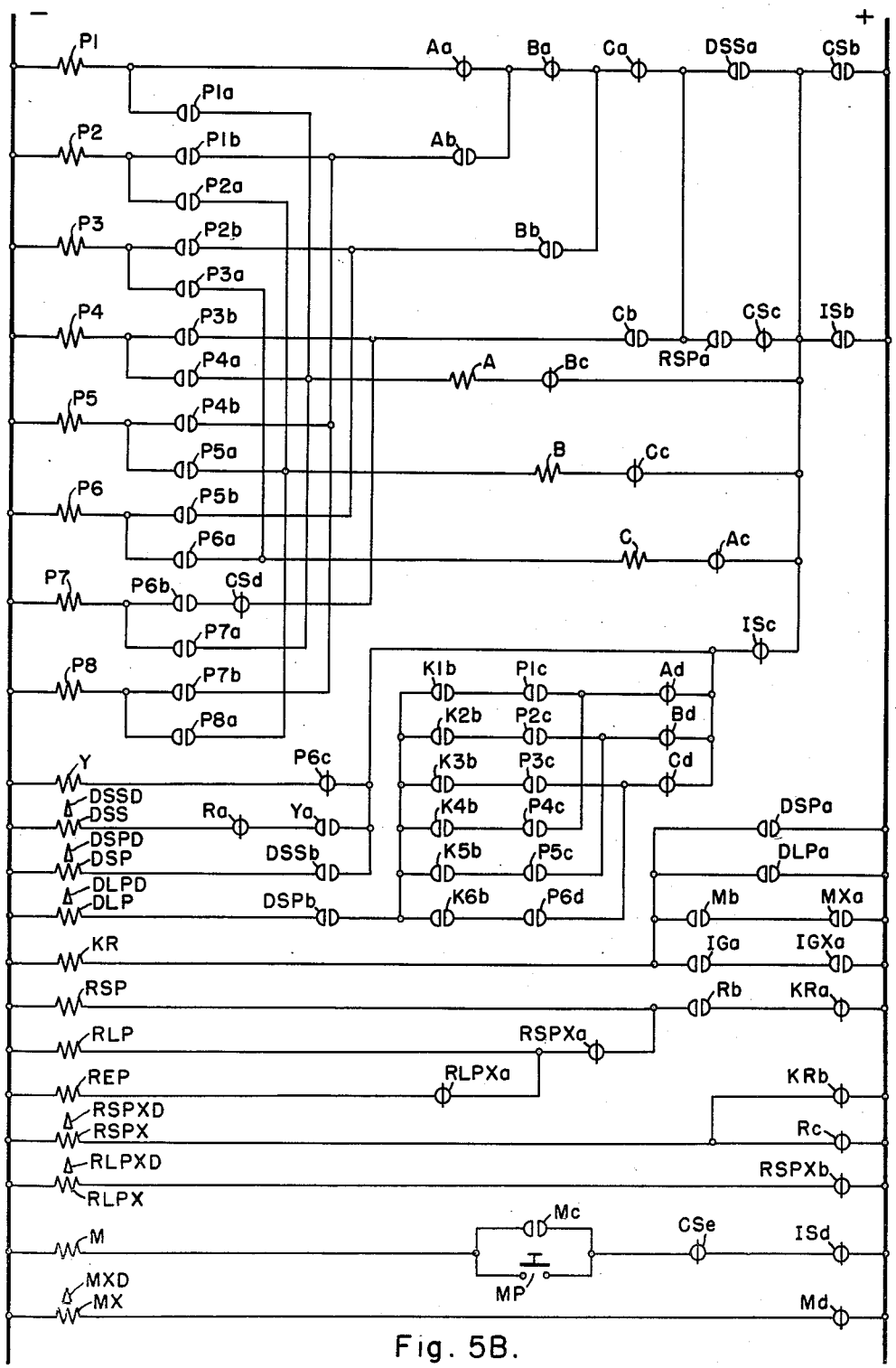
Figure 5C:
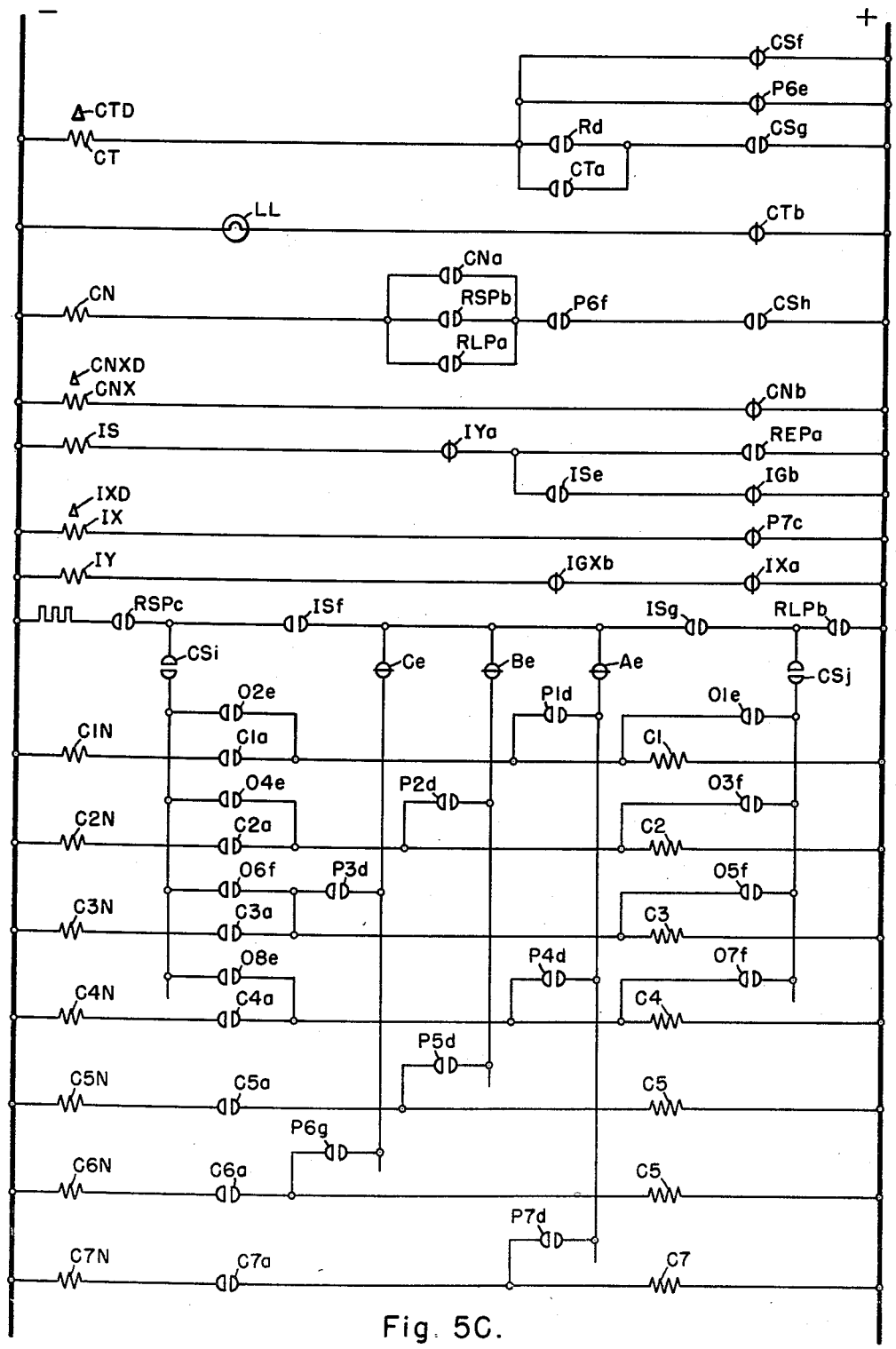
Figure 5D:
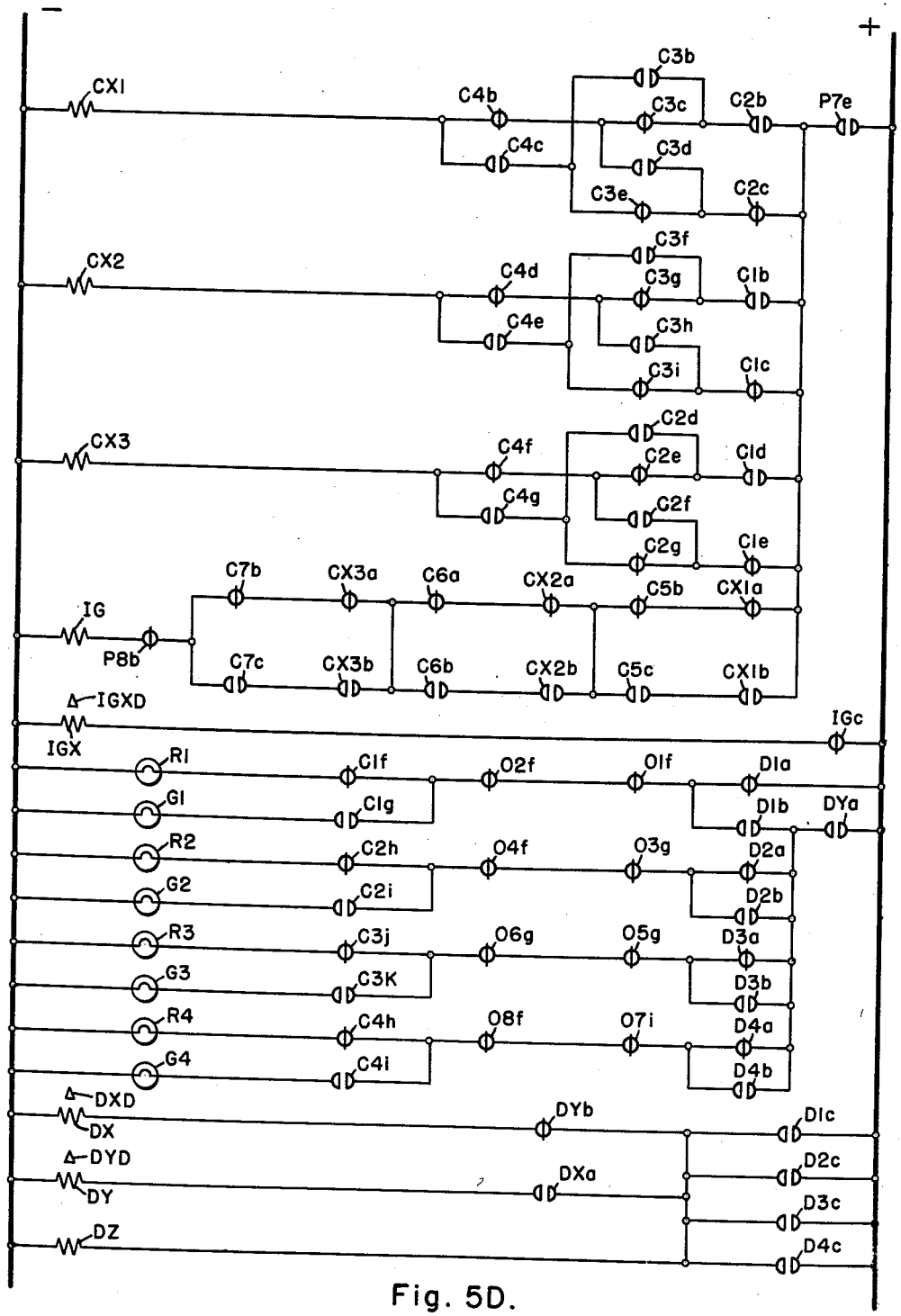
Figure 5E:
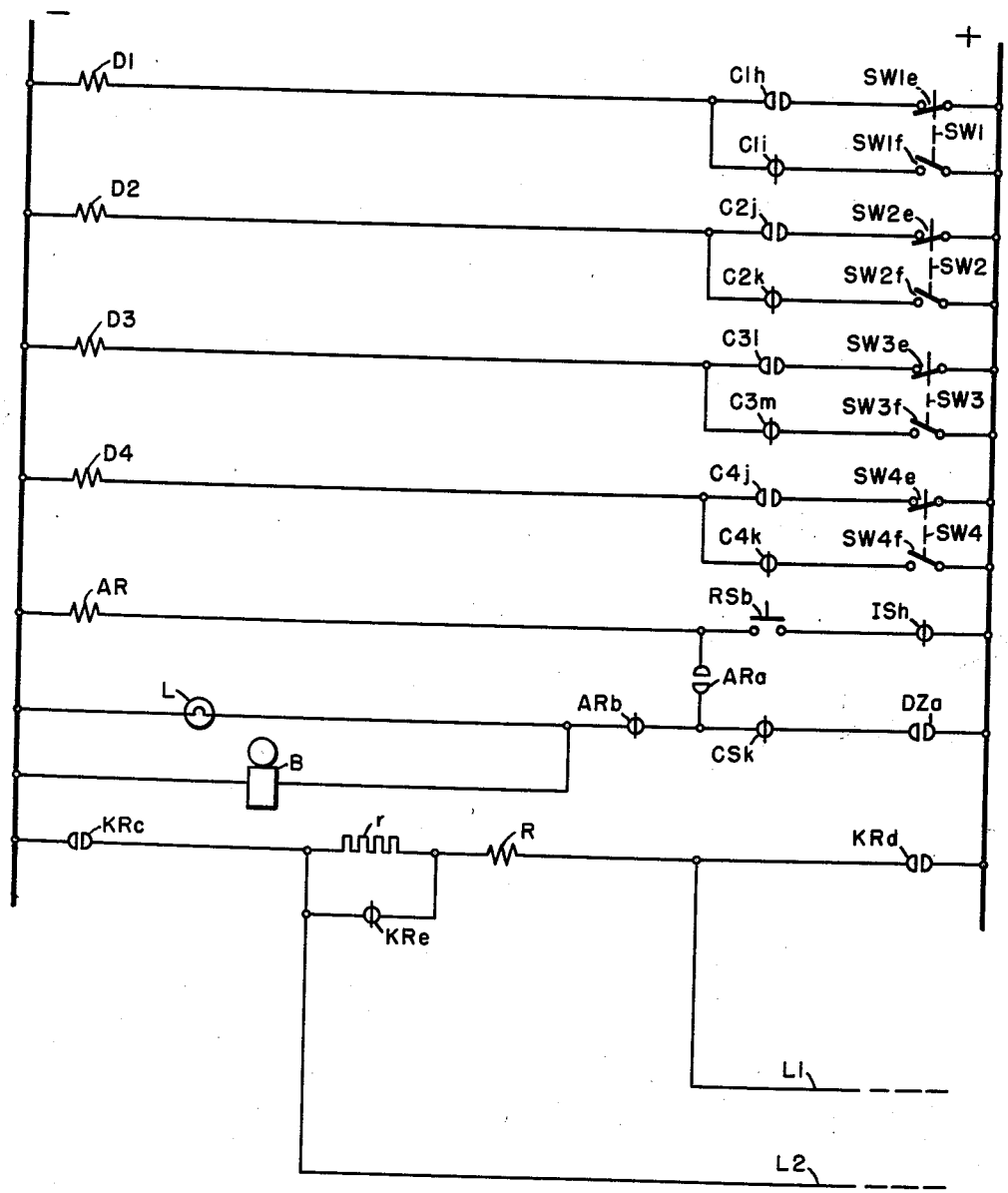
Figure 6A:
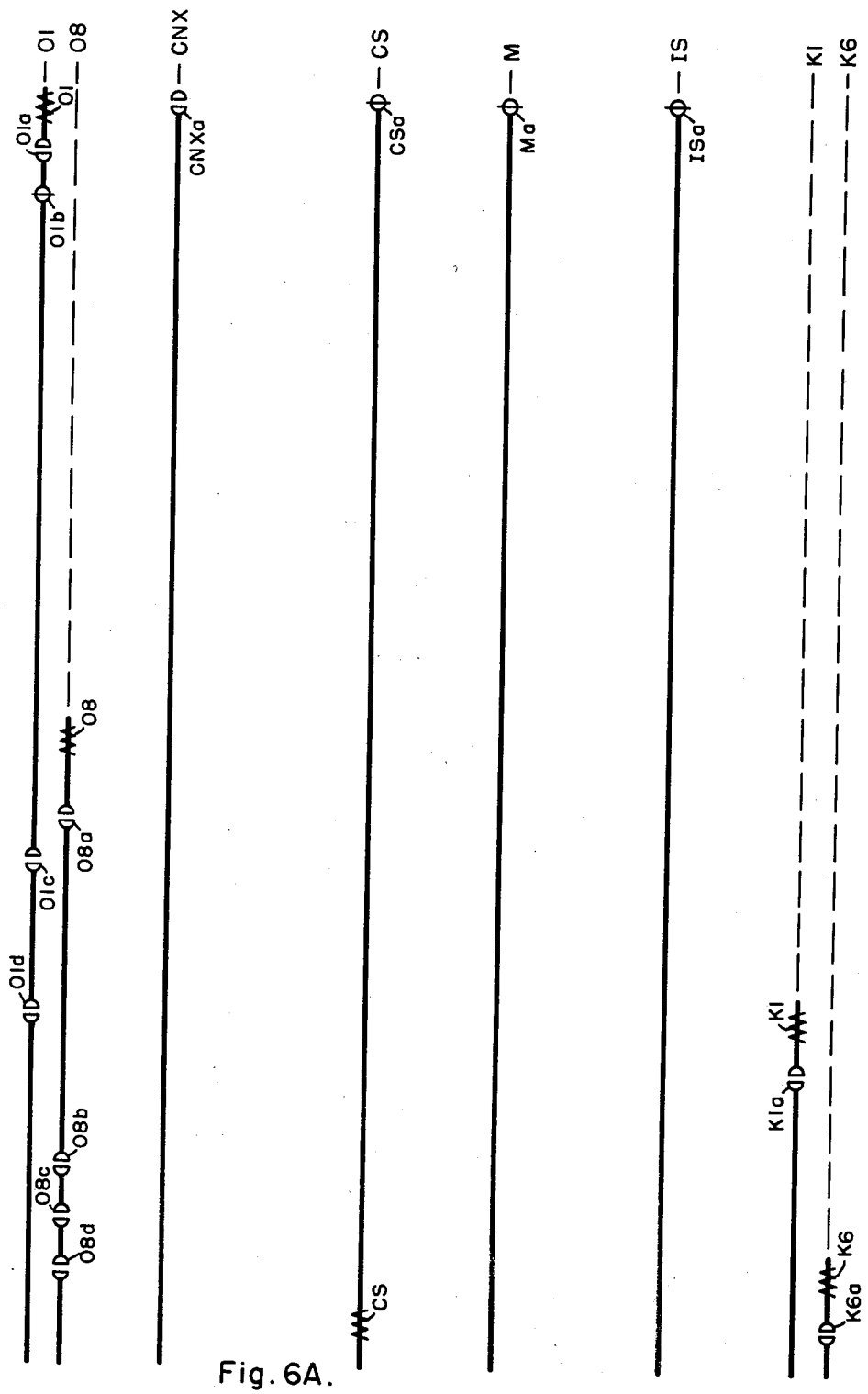
Figure 6B:
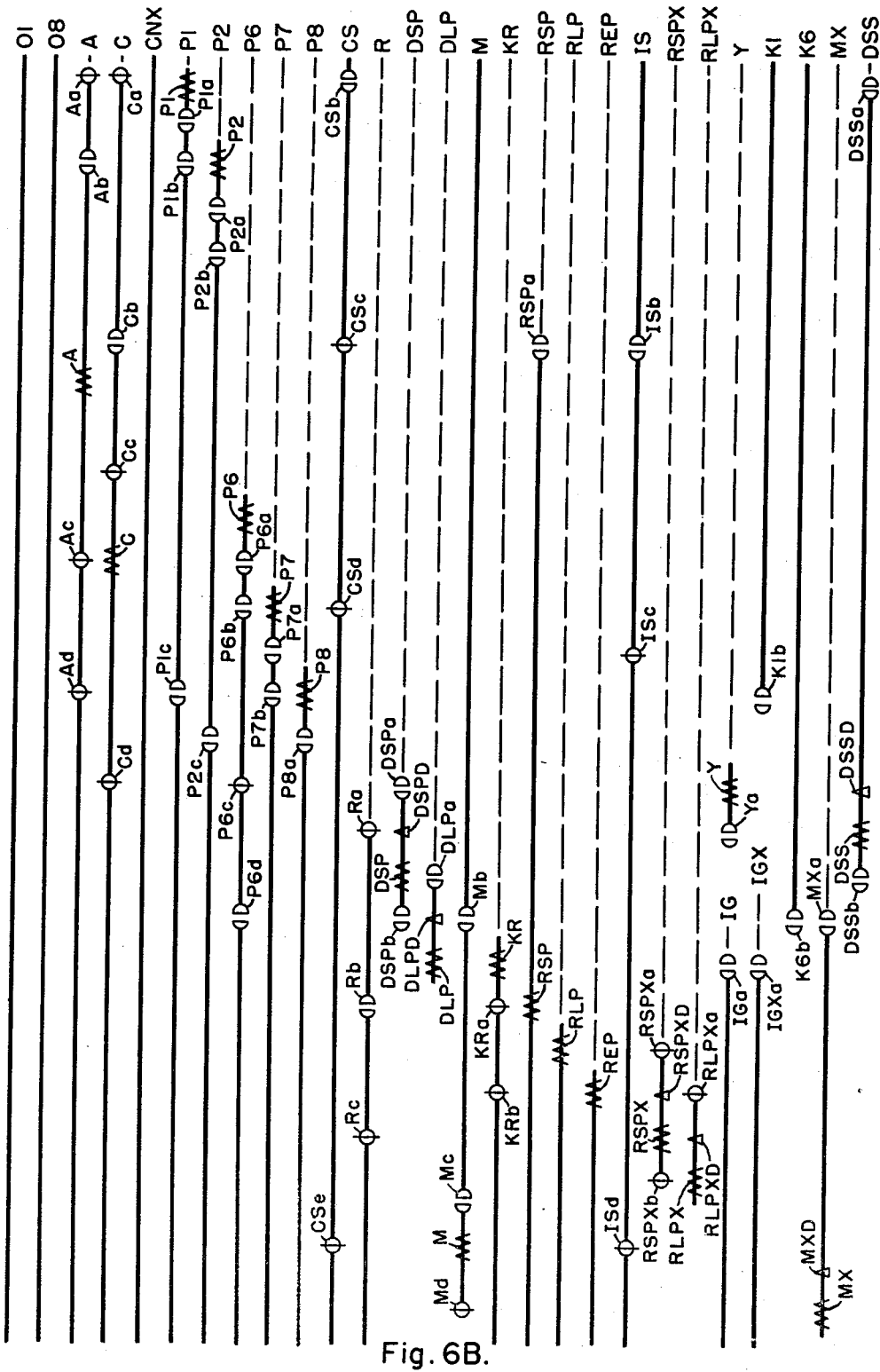
Figure 6C:
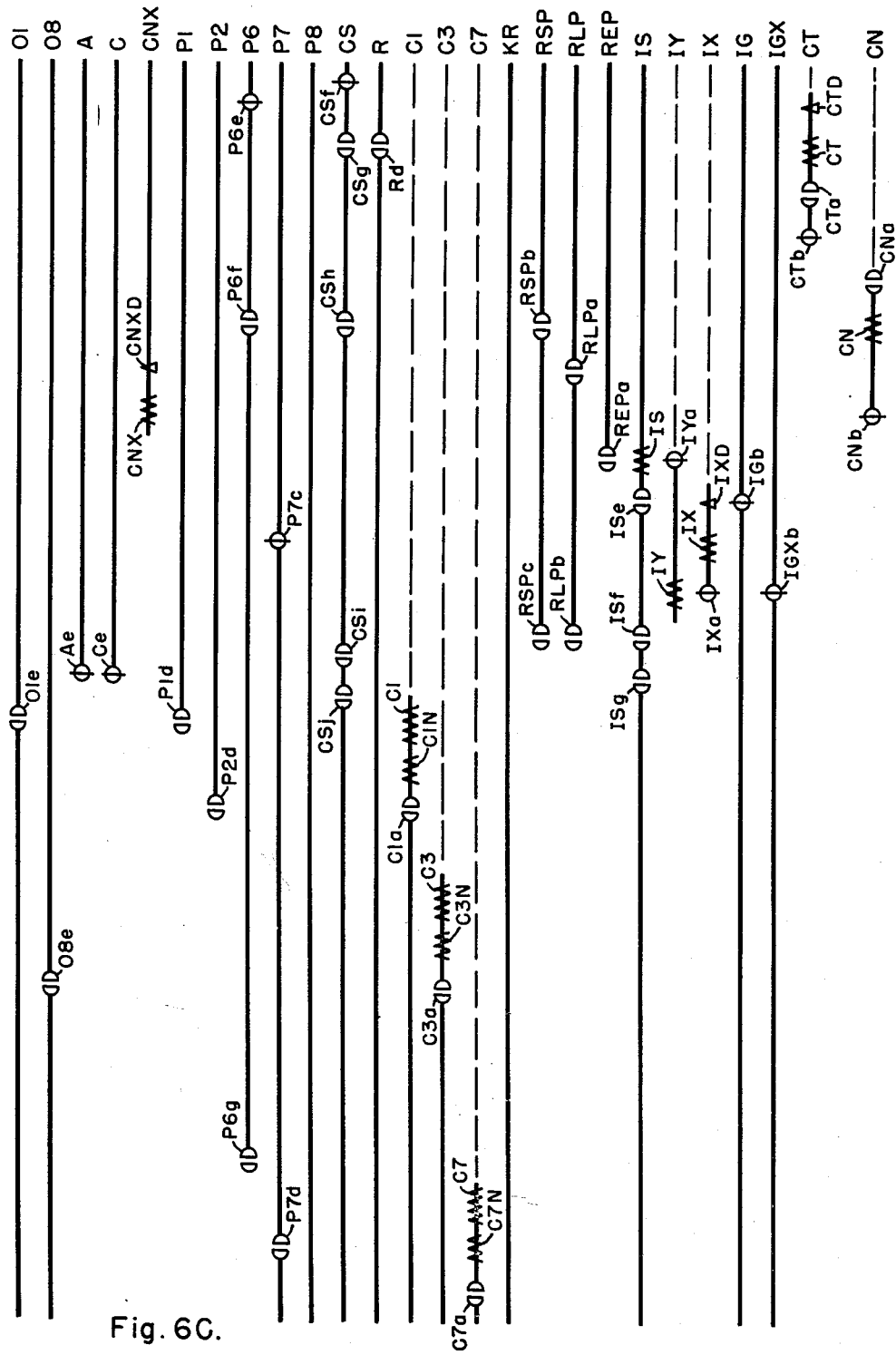
Figure 6D:
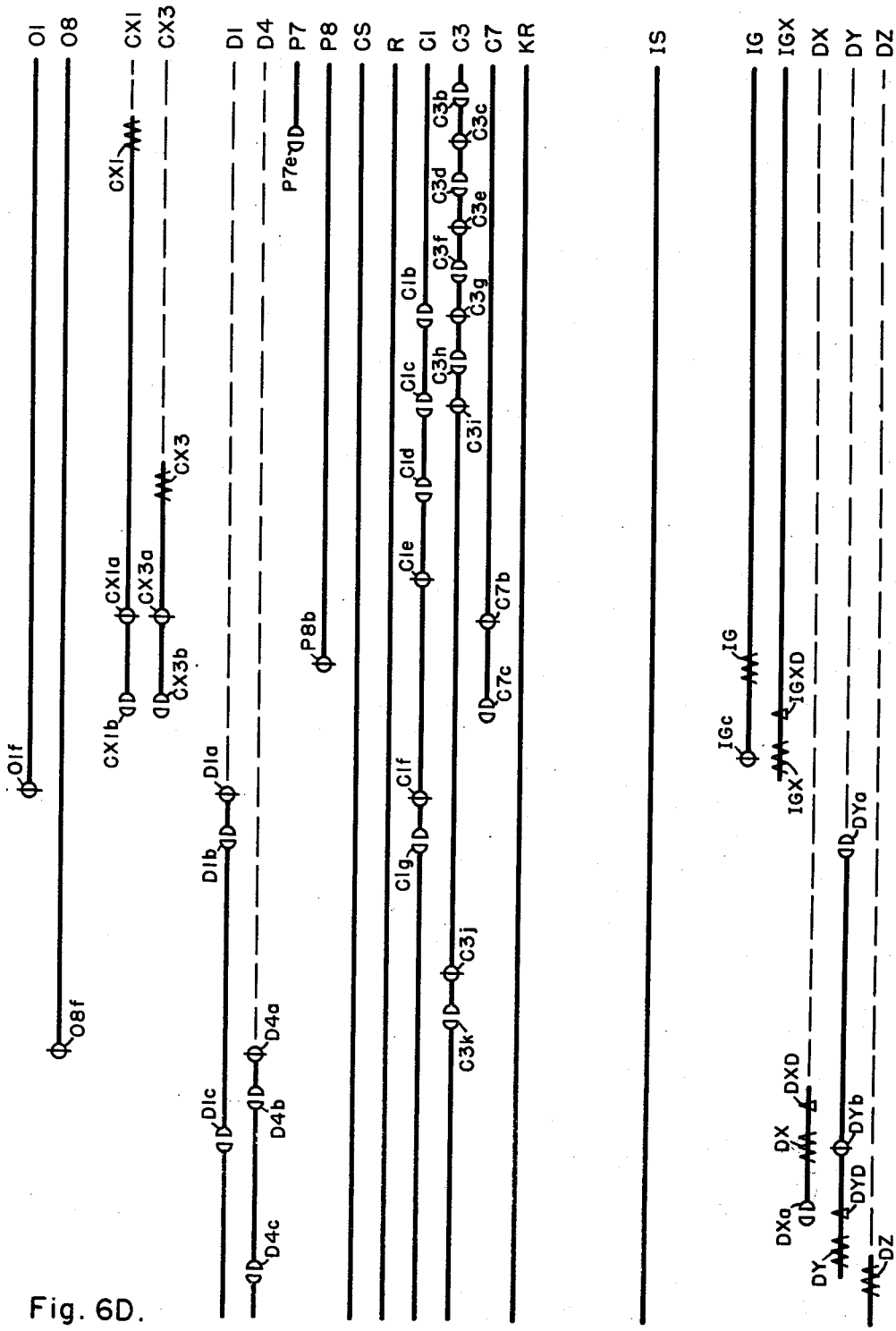
Figure 6E:
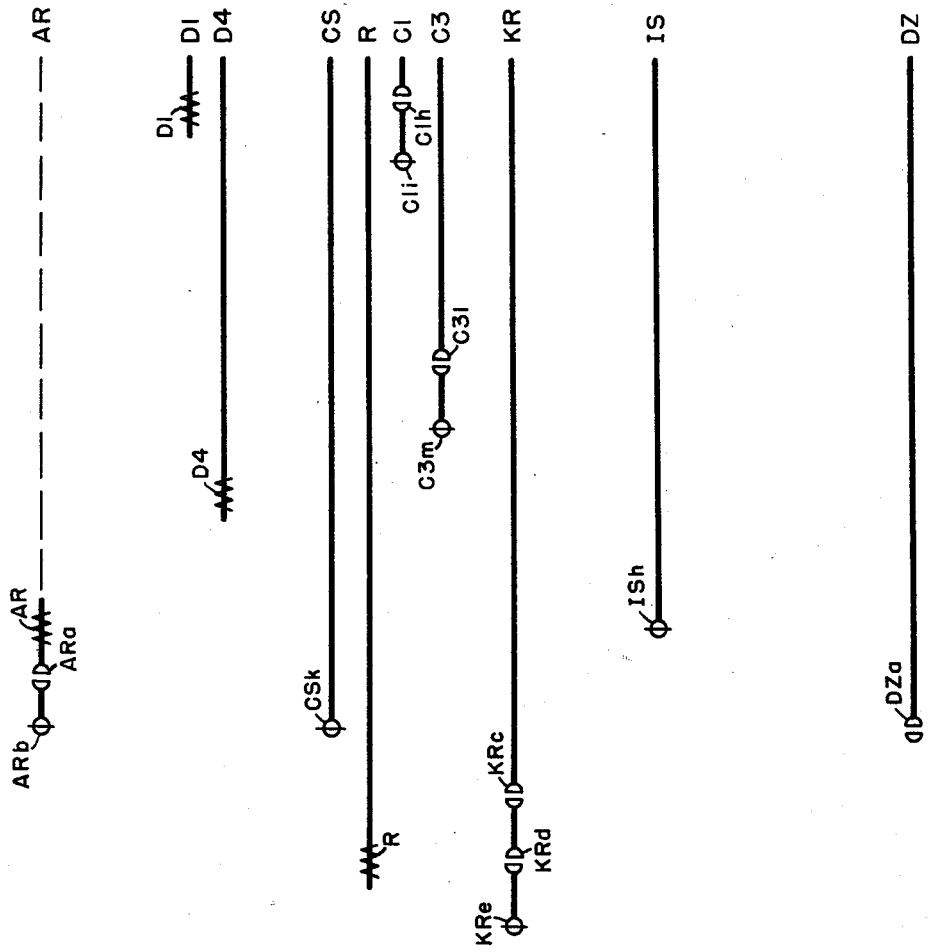
Figure 7A:
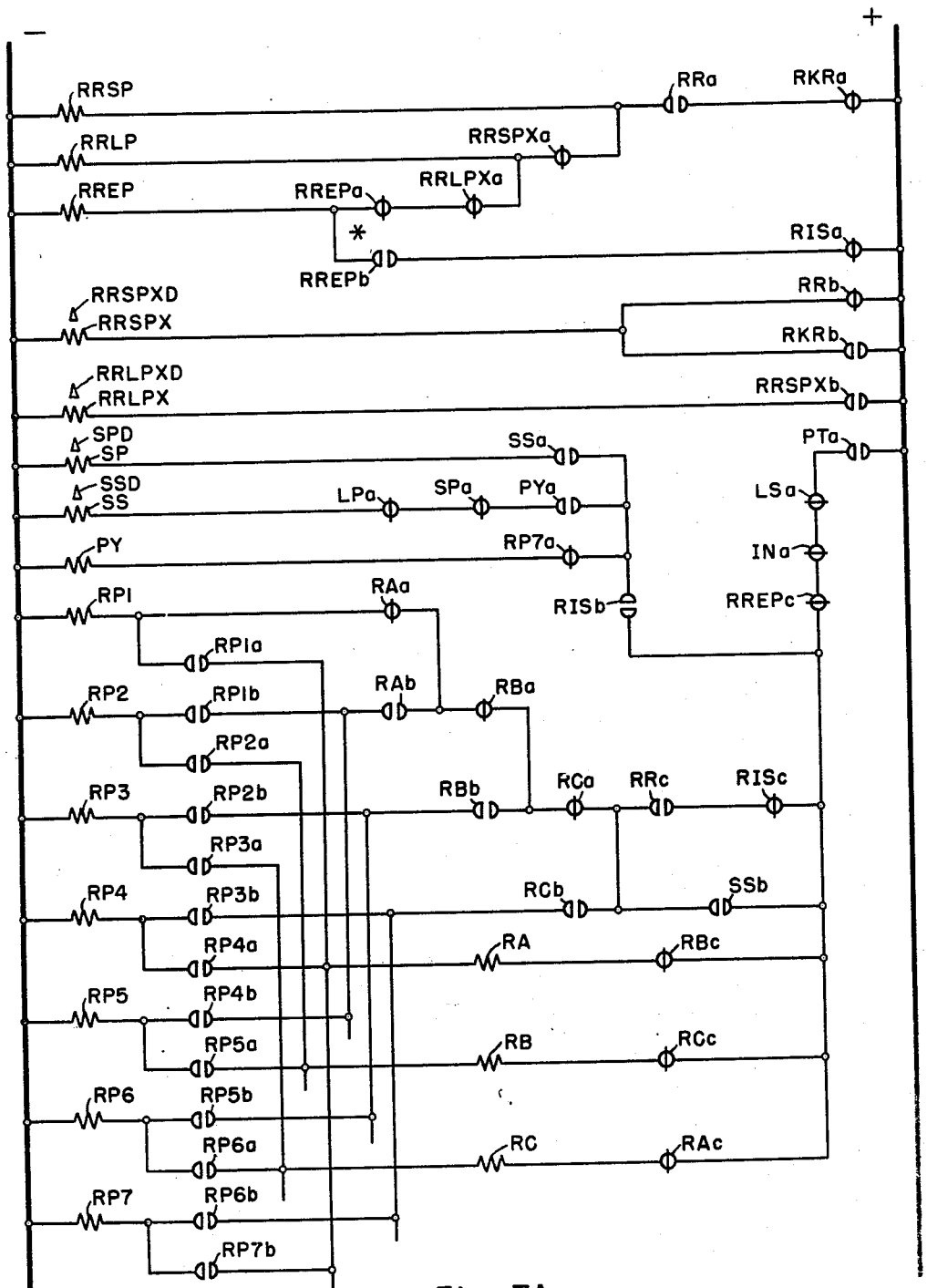
Figure 7B:
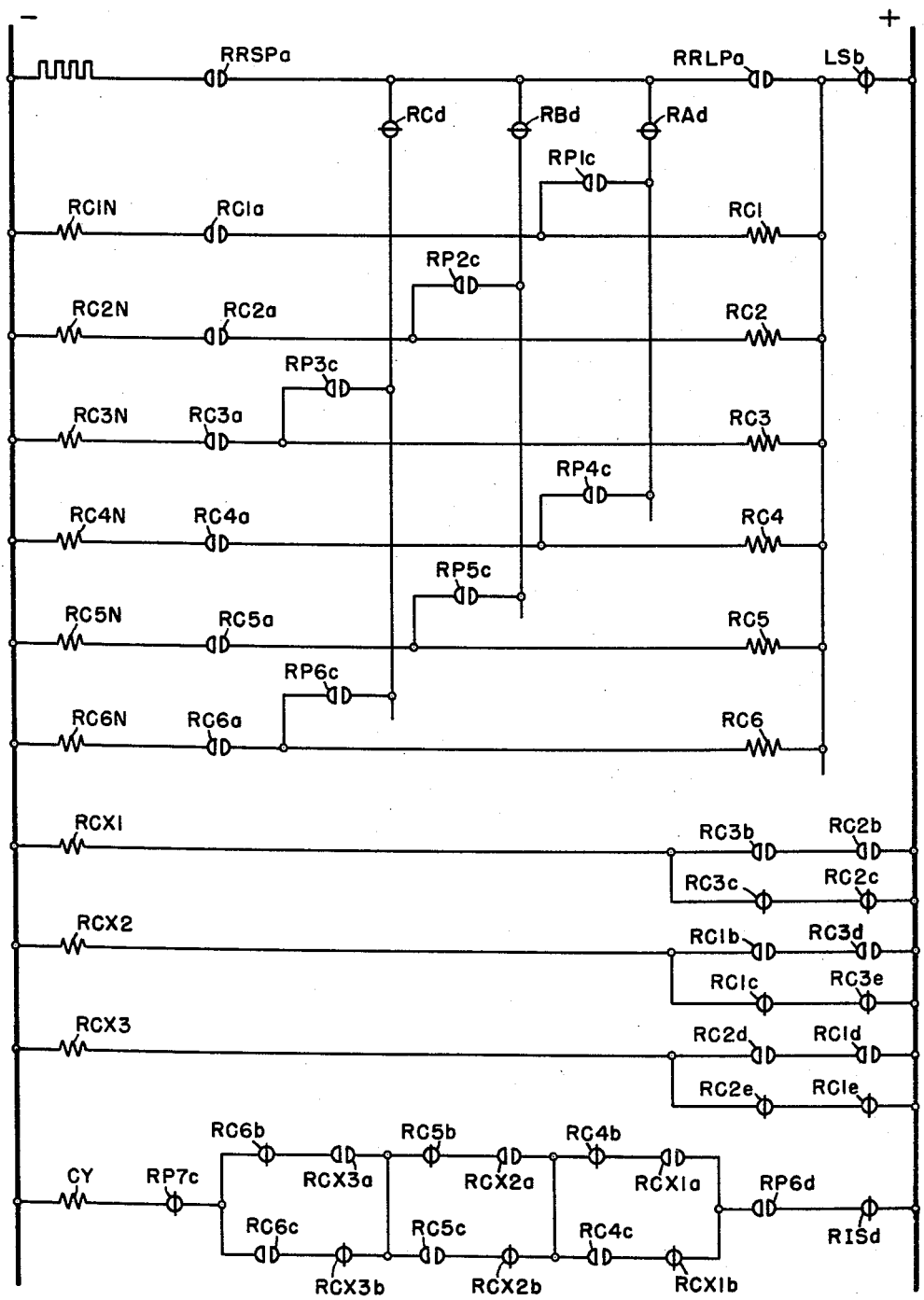
Figure 7C:
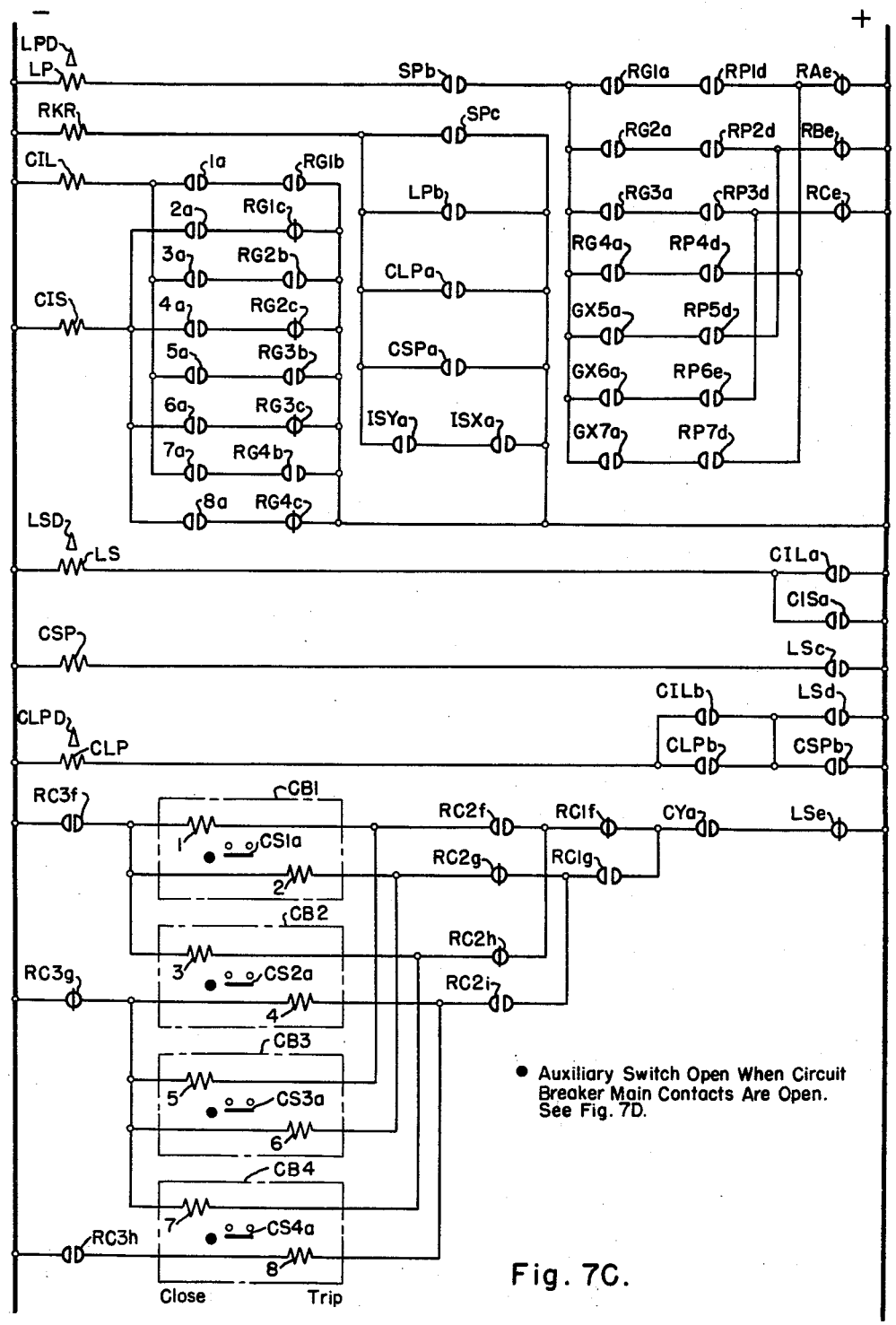
Figure 7D:
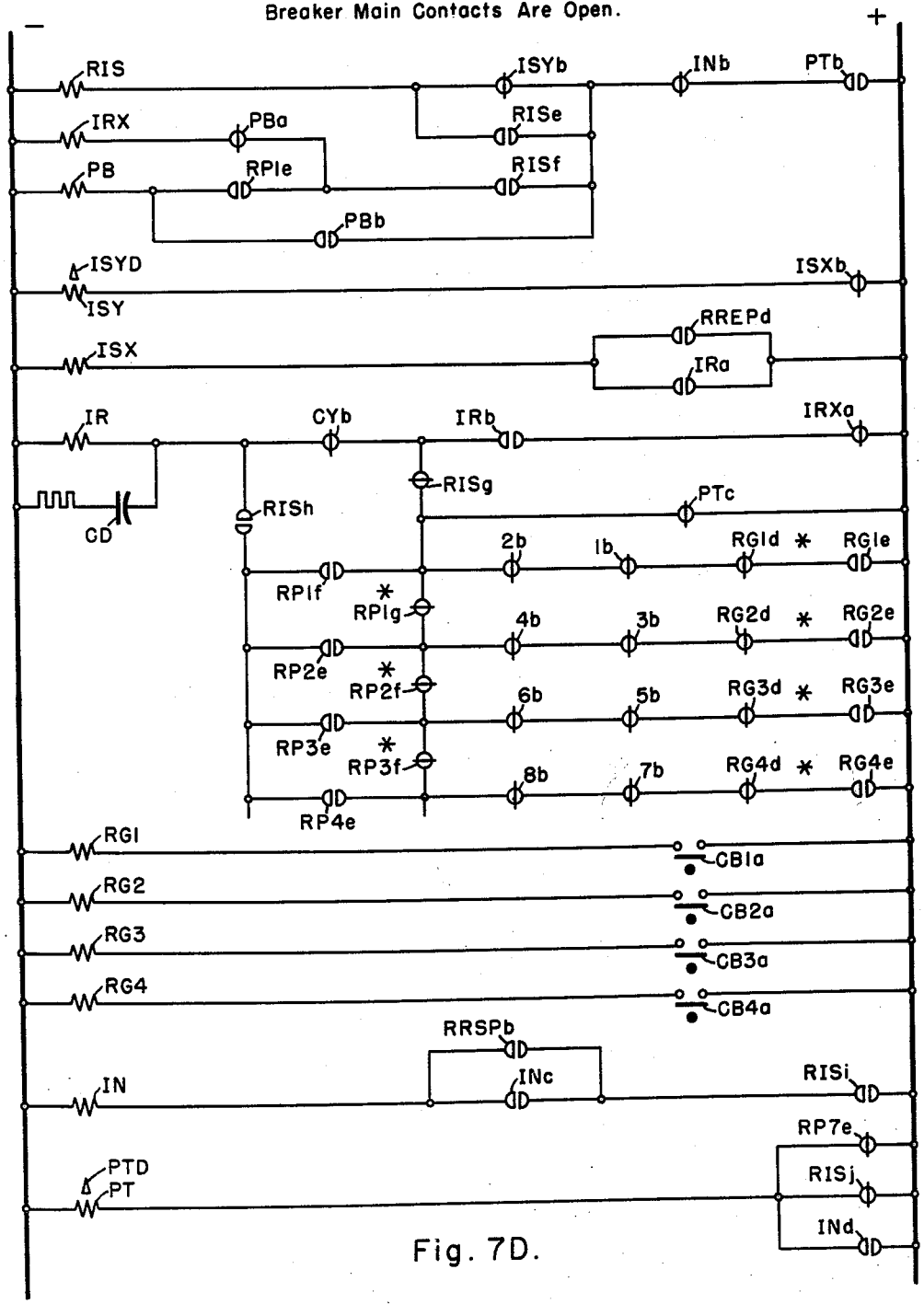
Figure 7E:
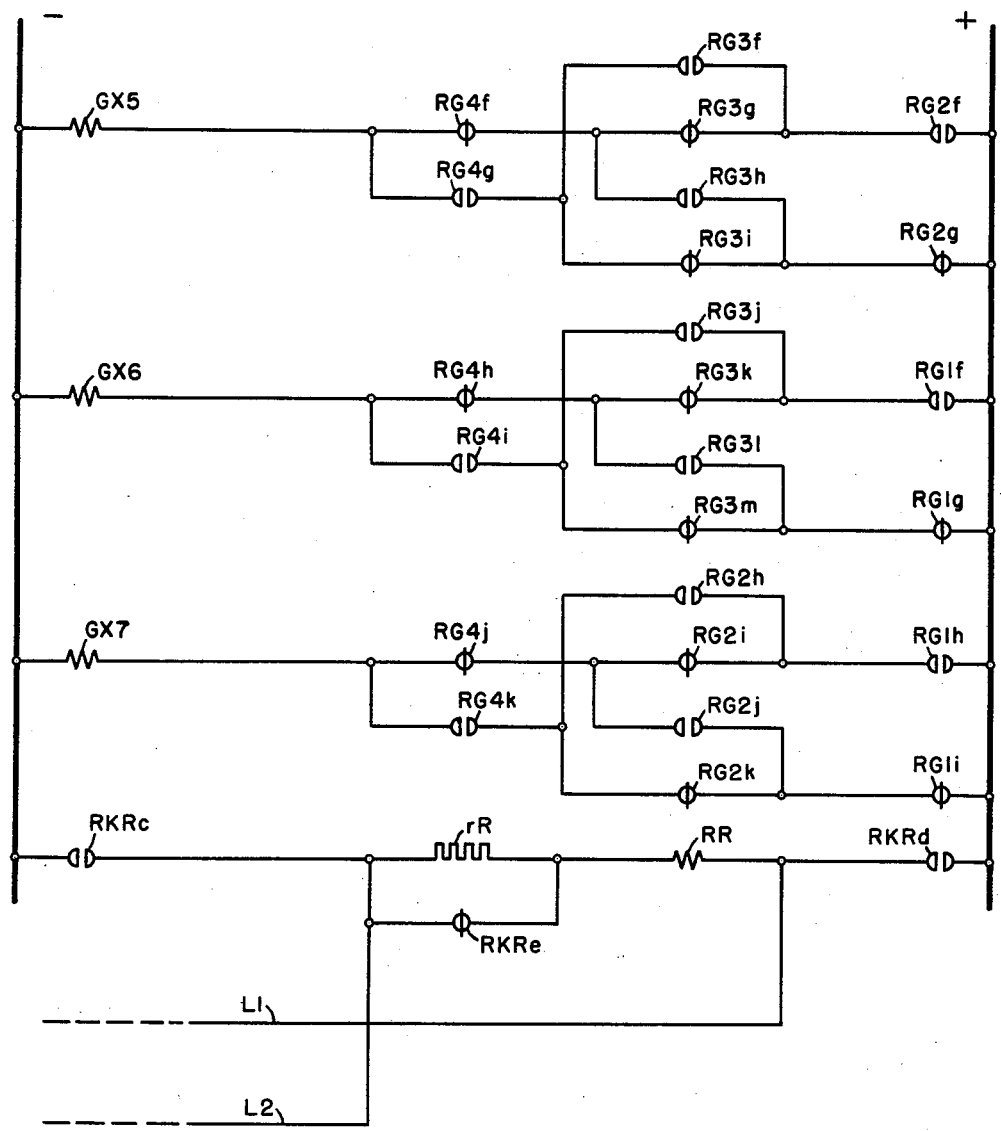
Figure 8B:
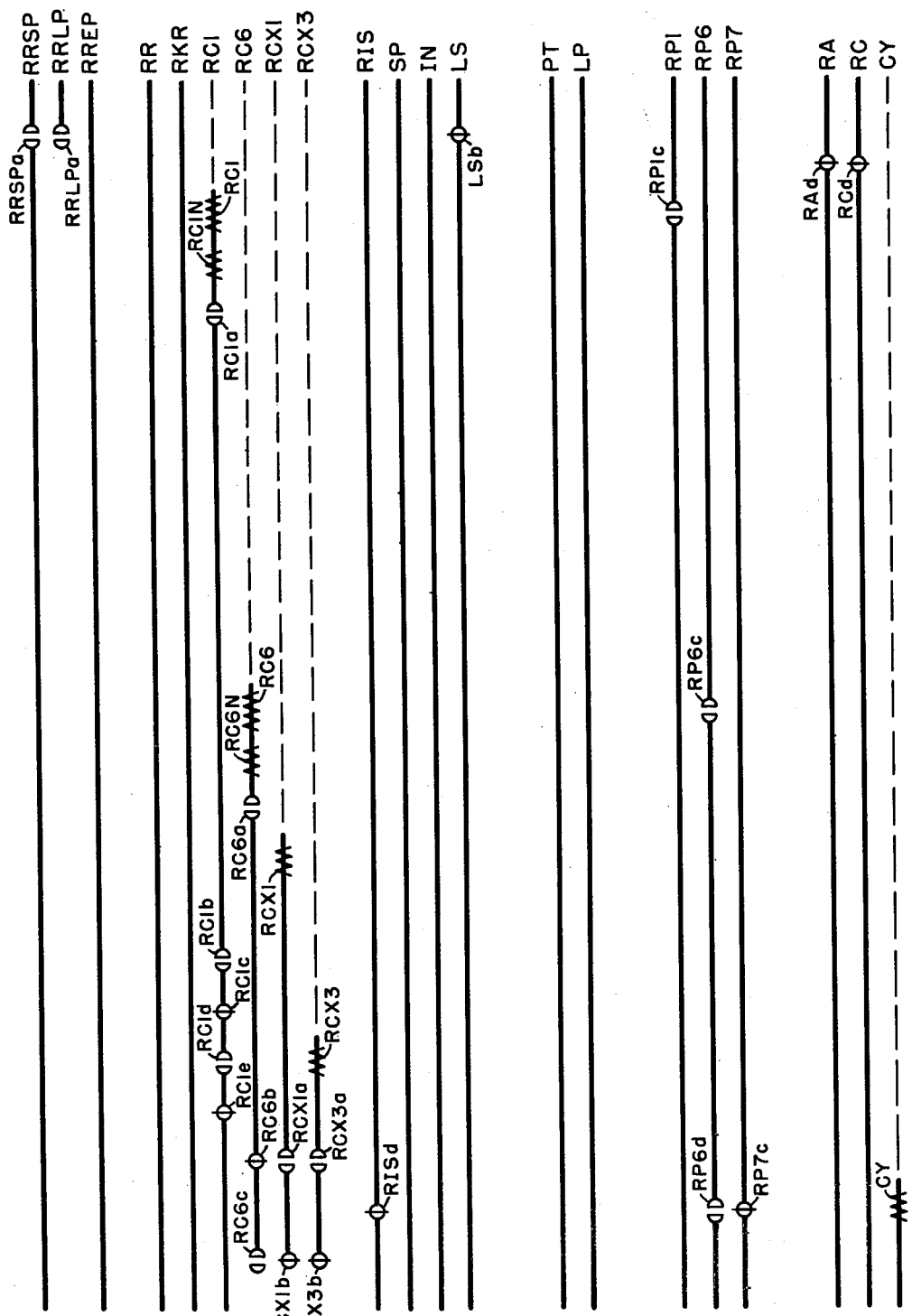
Figure 8C:
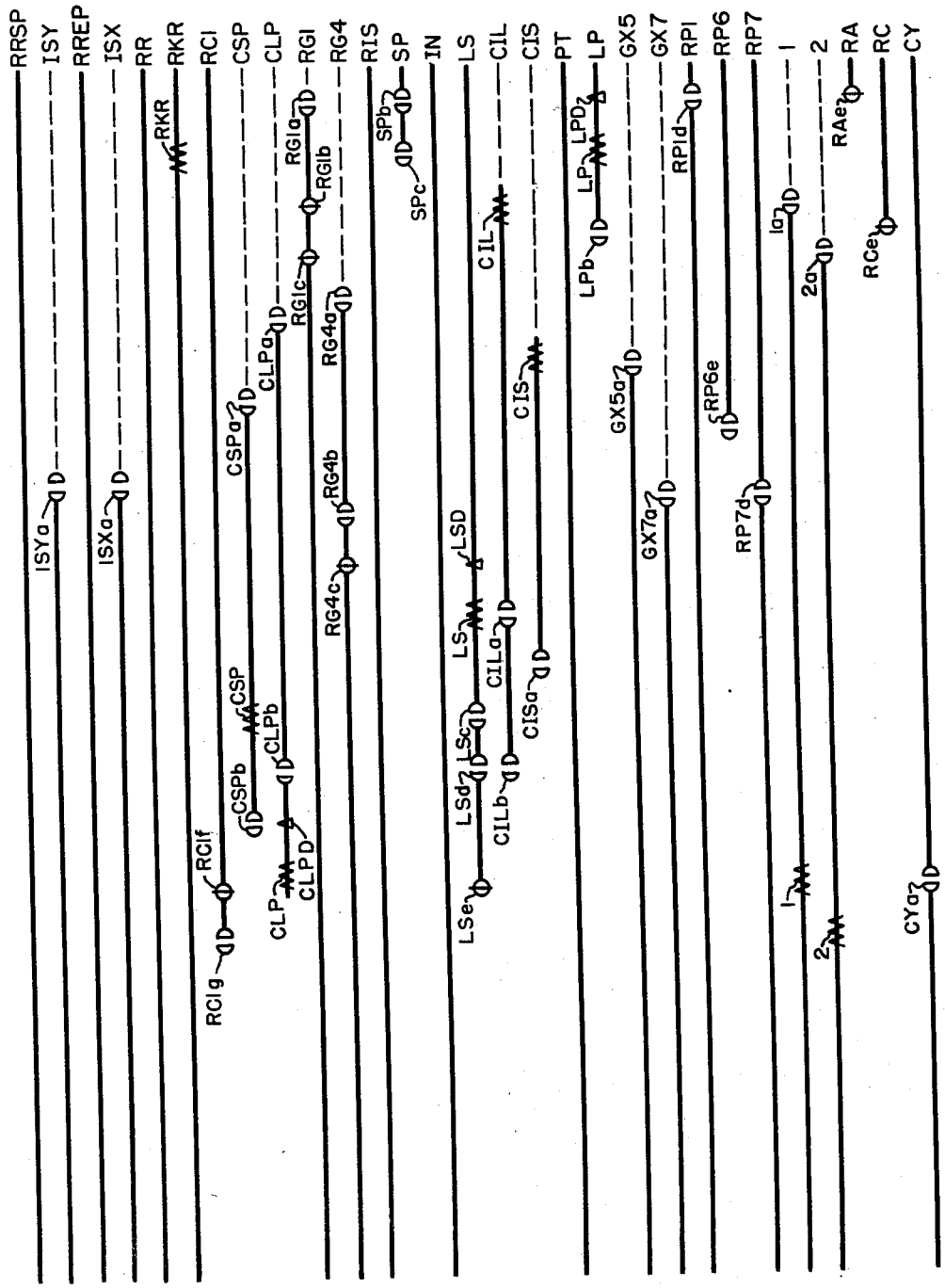
Figure 8D:
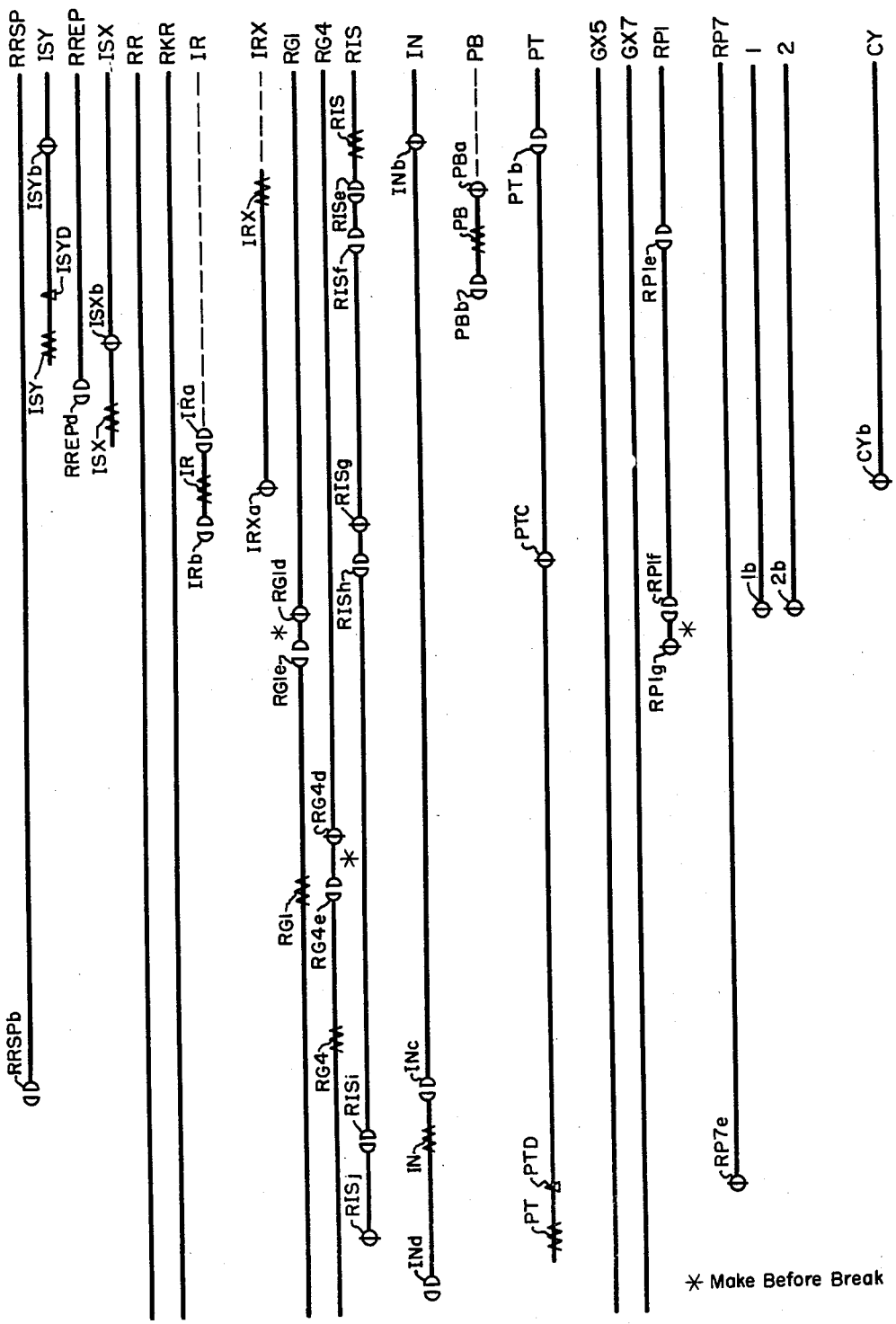
Figure 8E:
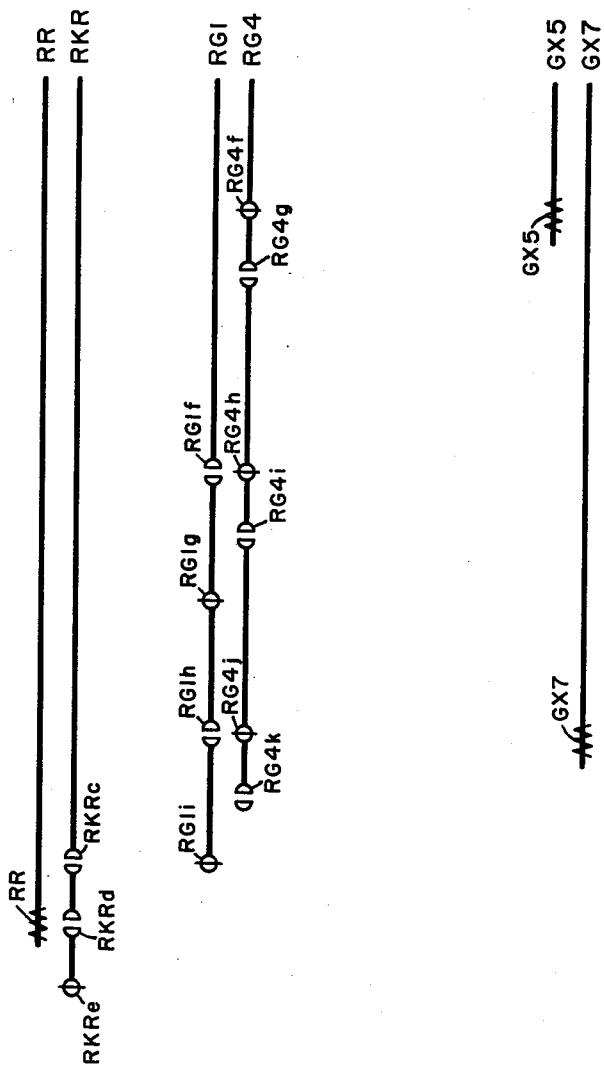

The contacts of relays RC1 to RC3 are combined in an odd-even checking circuit for check pulse relays RCX1, RCX2 and RCX3, as shown in FIG. 7B. The received check pulses 4, 5 and 6 are compared with contacts of the control relays RC1–RC3 and the check relays in the circuit of the code checking relay CY. If the sixth pulse is registered and no seventh pulse is received and the check circuits are in agreement, a circuit is provided through contacts RP7c, RC6b, RCX3a, RC5c, RCX2b, RC4c, RCX1b, RP6d and R1Sd for relay CY, which operates to complete the circuits to control relay No. 4. This circuit may be traced through contact RC3g, the winding of control relay No. 4, contact RC2i, contact RC1g, contact CYa and contact RLSe. A break contact CYb of relay CY opens and blocks the alarm register circuit IR from registering. A contact of relay No. 4 will trip breaker CB2, causing relay RG2 to release due to the operation of the circuit breaker auxiliary switch CB2a. A contact 4a in series with a break contact RG2c energizes the short check pulse relay CIS. Relay CIS energizes relay LS through contact CISa which in turn energizes relay CSP through contact LSC. A contact CSPa energizes the keying relay RKR to key the line conductors. A break contact of relay LS, releases relay 4 interrupting its circuit at contact LSe. Contact 4a interrupts the circuit of relay CIS. Another break contact LSb of relay LS releases relays RC1 to RC6 and in turn releases relay CY. Relay LS is released by contact CISa opening. With the release of relay CSP by the opening of contact LSC, the transmission of the short pulse to the dispatching office is complete. It should be noted that if the relay CIL had been energized after the control operation, the return pulse would have been long with the operation of both relays RCSP and RSLP.

At the dispatching office, the relay R is energized for the short pulse completing the circuit for the slow release timing relay CT at contact Rd. A make contact RB of the receiving relay R energizes relay RSP and break contact Rc releases relay RSPX. With relays CS, O4, and RSP energized, relay C2 is operated. The circuit is traced from coil C2 through contact O4e, contact CSi, and contact RSPc. Meanwhile, a contact RSPb of relay RSP energizes relay CN to interrupt the energizing circuit for relay CNX at contact CNb. When relay CNX drops out, relays O4, K3, K6, CS, P6 and C release because of the opening of contact CNXa. Relay CN releases because P6f opens, and relay CNX is energized through contact CNb. Contact C2j of relay C2 is in agreement with the operating position of the switch SW2 so that the disagreement relay D2 is deenergized, and the green lamp G2 is lighted through contacts C2h, O4f, O3g and D2a as soon as relay O4 is released.

If no pulse is received from the remote station, relay CT is fully released to close contact CTb and light a control abnormal lamp LL. Operating the pushbutton RS releases relays O4, K3, K6, CS, P6 and C. Relay CT is reenergized through contacts CSf and P6 and the control abnormal lamp LL is extinguished. The equipment returns to normal but the red lamp R2 will continue to flash just as it did when the toggle switch was first moved to the trip position. Another trip operation may be attempted by pushing the operate pushbutton OP2.

To describe an automatic breaker operation, assume breaker CB2 at the remote station, is automatically tripped. This deenergizes relay RG2 at CB2a and as soon as relay RG2 releases, the RG2 make-before-break contacts RG2e—RG2d momentarily complete a circuit to relay IR through contacts 3b, 4b, RP1g, RISg, and CYb. Capacitor CD insures operation of IR. The relay IR seals in through contact IRb and effects operation of relay ISX through contact IRa, completing a circuit to the keying relay RKR through contact ISXa. The keying relay RKR remains energized until relay ISY releases due to the opening of the contact ISXb, at which time relay RIS is energized through contact ISYb. The operation of relays ISX and ISY sent an extra long pulse to the dispatching office. Contacts RISb of relay RIS start the pulse control circuit to energize relays SS and SP. A contact SSb of relay SS energizes counting relay RP1, while contact SSa energizes SP. When relay SP operates to energize keying relay RKR at contact SPc, a pulse is applied to the line conductors L1, L2, and the circuit to relay SS is interrupted at contact SPa. The circuit to relay LP is established at contact RP1d and because relay RG1 is operated, relay LP is energized to put a long pulse on the line conductors. As soon as SS releases because of contact SPa opening, relay RA is operated to release relay LP. After a short delay relay SS is energized to operate relay RP2 and SP to start the second pulse. Since relay RG2 is not energized due to the breaker switch CB2 being open relay LP is not energized, and a short pulse is transmitted. The pulsing continues for a period of 7 pulses, the third and fourth pulses being long because the breaker switches CB3 and CB4 are closed, and the last three pulses being check pulses which are determined by the position of contacts of relays RG1 to RG4, in the circuits of relays GX5 through GX7, and will be respectively — + and —, so as to make the total of + pulses in each group checked even, including its respective check pulse, according to the pattern shown in FIG. 4.

It should be noted that after relay RIS is energized an energizing circuit is provided for relay IRX through contact RISf, and relay IR is released due to the opening of contact IRXa. When relay RP1 operates, relay PB is energized, opening contact PBa to release relay IRX and prepare a circuit through contact IRXa to set up relay IR for any changes in contact of the RG relays. In other words, the circuit just described insures that the change of position of any RG relay will be recorded. The circuit of the relay IR to the make-before-break RG relay contact is through a make contact RISh of relay RIS and through a make contact of relays RP1, RP2, etc. As the remote station sends pulses a change of an RG relay already indicated operates relay IR. A change of an RG relay which is yet to be indicated, does not operate relay IR. When the IR relay is operated during the transmission of the indication code, the equipment repeats the indication code operation to include the change taking place during the previous transmission.

At the dispatching office the initial extra long pulse sent from the remote station operates relay REP since the receiving relay R energizes relay RSP at contact Rb, and contact Rc opens to deenergize delay relay RSPX, while relay R is still operated, providing an energizing circuit for REP through contacts RLPXa, RSPXa, Rb and KRa. Relay IS is energized through contact REPa and sealed in through contacts ISe and IGb. Contact ISb of relay IS prepares the pulse control circuit, and contact ISg prepares the indication circuits. Each pulse causes the pulse control relays Pi, P2, etc. to operate. If a short pulse is received, a contact RSPc of relay RSP energizes the corresponding C relay. If a long pulse is received a contact of relay RSP first energizes the corresponding C relay and then the RLPb contact of relay RLP shunts the operating coil of the C relay and increases the current through the lower or neutralizing coil to cause the C relay to release quickly.

As the C relays are positioned, the contacts in the circuits of the D relays are changed. For the case assumed the contact of relay C2 will be in disagreement with the toggle switch SW2 contacts and D2 relay is operated to cause the flashing lamp relays DX and DY to operate, so that the green lamp G2 is flashed. By positioning the toggle switch SW2 to the open or green lamp position, the flashing lamp will burn steady and the alarm lamp and alarm bell will be cleared.

After all the indication and check pulses are registered on the relays C1 through C7, the combinations of contacts of relays C1 to C4 will operate the check relays CX1 through CX3 so that CX1 is energized, CX2 released and CX3 energized, in accordance with the indication check system. Contacts of relays C5 to C7 and CX1 to CX3 are compared and if the complete indication code is correct, a circuit is completed through contacts C7c, CX3b, C6a, CX2a, C5c and CX1b for the indication check relay IG, which operates. Contact IGa of relay IG in conjunction with a contact IGXa of relay IGX are used to operate the keying relay KR to send a single pulse to the remote station to operate relay RR and release relay RIS. If the received indication code is not a valid code, no check pulse is transmitted.

Upon the receipt of the indication check pulse at the remote station, relay RRSP is operated and an energizing circuit is provided for relay IN through contacts RRSPb. The indication timing relay PT which was first released as the last indication pulse was sent, is energized through contact INd. A break contact INb of relay IN releases relay RIS to return the equipment to normal. If no check pulse is received, the relay PT is completely released, after a time interval. A break contact PTc of relay PT thereupon energizes the indication start relay IR, and a make contact PT*b*, releases relay RIS so that another indication coding cycle of operation is repeated.

A master check operation in which all lamp indications are checked from the dispatching office is similar to the normal indication cycle. The dispatcher pushes the master check pushbutton MP, and relay M, in conjunction with relay MX, effects operation of the keying relay KR to send an extra long pulse to the remote station. This energizes relay RREP at the remote station and a contact RREP*d* in parallel with a contact IR*a* of relay IR energizes relay RISX. The remainder of the indication cycle is the same as described above.

From the above description and the accompanying drawings, it will be realized that we have provided a self-checking supervisory control system in which a predetermined number of selection-control code pulses are transmitted to set up control circuits for apparatus at a remote station and these pulses are followed by a fixed number of check pulses which are definitely co-ordinated with different groups of the control pulses to provide a positive check on the validity of the code before an operation is effected. Automatic operation of the apparatus at the remote station results in a complete position check of all the apparatus and each position check code is verified by sending a definite number of check pulses which provide a definite even or odd arrangement with different ones of the check pulses. Apparatus embodying the features of our invention provides an effective self-checking code arrangement which provides for reliable operations of the apparatus with a minimum of pulse transmission.

Since certain changes and modifications may be made in the above embodiment of the invention without departing from the spirit and scope thereof, it is intended that all the matter contained in the above description and shown in the accompanying drawings should be considered as illustrative and not in a limiting sense. While in the embodiment hereinbefore described, circuit breakers are being controlled, it will be realized that the same apparatus may be used to start or stop motors, open or close valves or perform other similar control functions.

We claim as our invention:

1. In a supervisory control system for controlling apparatus at a remote station from a dispatching office, sending means at the dispatching office, counting means, control means effecting operation of the sending means to produce distinctively different signals, and means including a plurality of selection keys connecting the counting and control means to effect operation of the sending means to selectively send different arrangements of a fixed number of control signals with each arrangement followed by a plurality of check signals each related to a different predetermined group of the preceding arrangement of control signals so that the sum of one type of said distinctly different signals in each group as combined with the corresponding check signal is odd or even having a definite relation with a different group of the control signals.

2. A supervisory control system comprising, sending means at a dispatching office, means including counting means operable to determine a code comprising a fixed plurality of signal intervals in succession, signal control means selectively operable to vary the duration of the signal in each interval, operation means including a plurality of different ones of the control means, receiving means at a remote station actuated by said signals, counting means actuated by the receiving means, means selectively responsive to the duration of the signals, control means jointly controlled by the counting means and the signal duration responsive means operable to set up circuits for performing different operations at the remote station dependent on the combinations of signals in the first portion of a code, and check means responsive only to a predetermined combination of check pulses in the latter portion of a code for a given combination of signals in the first portion of the code to complete the circuit setup.

3. In a supervisory control system, sending means at a dispatching office selectively operable to produce signal codes, each code comprising a fixed total number of signals of two different kinds including a lesser fixed number of control signals followed by check signals which are each of one kind or the other depending on whether the total number of one kind in a predetermined group of said control signals less than the whole number are even or odd, receiving means at a remote station including means selectively responsive to the different kinds of signals, a plurality of operating means at the remote station operable to perform different operations, control means selectively responsive to different combinations of the control signals to set up operating circuits for different ones of the operating means, and check means responsive only to a predetermined pattern of check pulses for a given operation code to complete the operating circuit setup.

4. In a supervisory control system for a plurality of devices at a remote station having two operating positions, means responsive to the position of each device, indication means responsive to a change of position of any one of said means, sending means, counting means operable to effect operation of the sending means to send a signal for each device and to send a predetermined number of check pulses, control means controlled jointly by the counting means and indication means selectively operable to effect operation of the sending means to change the characteristics of the signals in accordance with the positions of the devices, and check means responsive to the positions of different predetermined groups of the devices to determine the characteristics of the different check signals.

5. Supervisory control apparatus comprising, sending means, means actuated by change in position of each of a plurality of devices having two operating positions, counting means operable to determine a fixed number of signal intervals for the sending means consisting of one interval for each device and a predetermined number of check pulses, means initiating operation of the counting means and sending means including an indication detection relay, register means responsive to the position of each device selectively operable to control operation of the sending means to produce distinctively different signals dependent on the positions of the devices, and auxiliary register means responsive to the positions of different predetermined groups of the register means for controlling the operation of the sending means to produce distinctively different signals during the sending of the check pulses depending on the positions of the register means in said predetermined groups.

6. Supervisory control apparatus comprising, signal sending means, pulse control means for effecting operation of the signal sending means including long and short pulse control relays, register means comprising relays responsive to a change in position of each of a plurality of devices having two operating positions, indication start means responsive to operation of one of said relays for effecting operation of the short pulse control means, counting means operable to determine operation of the signal sending means to send a signal for each device plus a predetermined number of check signals, auxiliary register means selectively responsive to the positions of predetermined groups of the register relays, and circuit means controlled jointly by the counting means and the register relays and the auxiliary register means to selectively effect operation of the long pulse relay during different operations of the signal sending means.

7. Supervisory control apparatus comprising, signal sending means, pulse control means including long and short pulse control means, counting means controlling operation of the short pulse control means to determine a fixed number of signals consisting of one for each of a plurality of devices having two positions and a fixed number of check signals, register means including a relay associated with and responsive to the position of each device, auxiliary register means including a check relay for each check signal, said check relays being responsive to the operation of different combinations of the register relays, indication detection means responsive to operation of any one of the register relays to effect operation of the short pulse control means, circuit means jointly responsive to operation of the counting means with the register and auxiliary relays to check the position of each device and selectively effect operation of the long pulse control means during predetermined ones of the signals, and circuit means controlled by the counting means preventing operation of the indication detection means during operation of the counting means by operation of one of the register relays before the position of its associated device is checked.

8. Supervisory control apparatus comprising signal sending means, counting means operable to provide operations of the sending means in consecutive intervals to produce position indication signals for each of a plurality of devices having two operating positions and to produce a subsequent fixed number of check signals relating to the indication signals, means operated by a change in position of each of said devices, means initiating a checking of the position of each device including indication detection means controlled by the change of position means, said counting means having contacts connected in circuit between the change of position means and the indication detection means to prevent operation of the detection means in response to a change in position of one device, during the checking of another device until after the position of the other device is checked, and means including control means controlled jointly by the counting means and the change of position means to vary the operation of the sending means to produce selected ones of the position indication signals and the check signals.

9. In a supervisory control system, sending means, counting means operable to effect operation of the sending means to produce a fixed total number of pulses including a fixed number of operation pulses followed by a fixed number of check pulses, pulse control means operable to effect operation of the sending means to produce pulses of different lengths, a plurality of relays operable jointly with the counting means to effect operation of the control means, means including a plurality of operation switches operable to preset operating circuits for operating different ones of said plurality of relays to produce different arrangements of long and short operating pulses followed by a predetermined arrangement of long and short check pulses dependent on the arrangement of the operating pulses, receiving means at a remote station selectively responsive to the long and short pulses, counting means operated by either long or short pulses, register means selectively controlled by the receiving means dependent on whether the pulses are long or short, control means selectively responsive to operation of part of the register means by the operating pulses to set up a circuit for operating one of a plurality of devices at the remote station, and check means operated by a part of the register means operated by the check pulses to complete the circuit for operating said one device.

10. In a supervisory control system, sending means at a dispatching office selectively operable to produce coded signal combinations each comprising a fixed total number of signals of two different kinds including a lesser fixed number of control signals followed by check signals which are each of one kind or the other depending on whether the total number of one kind in a predetermined group of said control signals less than the whole number are even or odd so that the total number of one kind of signals in each predetermined group and the corresponding check signal is odd, receiving means at a remote station including means selectively responsive to the different kinds of signals, a plurality of operating means at the remote station operable to perform different operations, control means selectively responsive to said different combinations of the control signals to set up operating circuits for different ones of said plural operating means at the remote station, and check means for comparing each control signal with two check signals, said check means being responsive to the different signal combinations only when the total number of one kind of signal in each group of control signals and its corresponding check signal is odd to complete the said operating circuit setup.

11. In a supervisory control system for controlling apparatus at a remote station from a dispatching office, means for sending distinctly different signals, control means effecting operation of the sending means to send different arrangements of a fixed number of said distinctly different signals, each arrangement including a group of control signals followed by a group of check signals corresponding to the control signals, with each check signal related to a different predetermined plurality of the control signals of the corresponding arrangement so that the individual sum of one type of said distinctly different signals in each plurality of signals as combined with the corresponding check signal is odd or even, each said combination of corresponding control signals including at least one control signal of another combination in the same arrangement of said different arrangements.

12. A supervisory control system comprising a dispatch office and a remote station, each having sending and receiving means; said sending means at the dispatch office including means selectively operable to send different ones of different binary self-checking codes, each code including enumeration signals and check signals; said receiving means at the remote station including means for selectively operating individual ones of a plurality of apparatus in accordance with the received code, and including code check means for comparing each enumeration signal with two check signals to prevent operation of the selected apparatus if the code is invalid; and means responsive to operation of said code check means if the code is valid to transmit a code check pulse to the dispatch office to effect normal reset of the dispatch station equipment.

13. A supervisory control system comprising a dispatch office and a remote station, each having sending and receiving means; said sending means at the dispatch office including means selectively operable to send different ones of different binary self-checking codes, each code including enumeration signals and check signals; said receiving means at the remote station including means for selectively operating individual ones of a plurality of apparatus in accordance with the received code and including code check means for comparing each enumeration signal with two check signals to prevent operation of the selected apparatus if the code is invalid; said sending means at the remote station being operable in response to operation of the code check means in validating the received code to send a check pulse to the dispatch office; means at the dispatch office operable to indicate failure of code validation in the event the check code is not received within a prescribed time; and means at the dispatch office operable to reset the dispatch office equipment to normal in response to receipt of the check code.

14. Supervisory control equipment comprising a dispatch office and a remote station, each having a sending means and a receiving means; said sending means at the dispatch office including means selectively operable to send different ones of a plurality of control codes consisting of a predetermined number of long pulses and a predetermined number of short pulses in predetermined order, each said control code being followed by a check code comparable with the corresponding control code to provide a validity check of the control code; said receiving means at the remote station including validity check means for comparing each signal of the received control code with two signals of the check code and operable to perform an operation relating to the control codes if the code is checked as valid by the validity check means; means responsive to a validity check to effect operation of the sending means at the remote station to send a check code to the dispatch office; means at the dispatch office responsive to the check code to reset the dispatch equipment to normal.

15. Supervisory control apparatus for a plurality of devices at a remote station, each device having two operating positions, comprising: sending and receiving means at each of a dispatch office and a remote station; means operable in response to a change in the operating position of any one device to effect operation of the sending means at the remote station to send in predetermined succession a position indicating signal of one type or another for each device depending upon the operating condition of the corresponding device; means responsive to the positions of the devices to effect operation of the sending means at the remote station to send a check code for said individual signals in sequence with the position indicating signals; said receiving means at the dispatch office including means for indicating the position of each device in accordance with the received position indicating signals; check means at the dispatch office for preventing operation of the indicating means unless the received code signals are validated when compared with the check code; means responsive to validation by the check means for operating the sending means at the dispatch office to send a check signal to the remote station; and means at the remote station operable to restart a transmission of position indicating signals for each of the plurality of devices if a check code is not received from the dispatch office within a prescribed time.

References Cited in the file of this patent

UNITED STATES PATENTS

| | | |
|---|---|---|
| 2,344,231 | Burns | Mar. 14, 1944 |
| 2,399,734 | Hailes et al. | May 7, 1946 |
| 2,409,696 | Lewis | Oct. 22, 1946 |
| 2,679,034 | Albrighton | May 18, 1954 |
| 2,698,425 | Miller | Dec. 28, 1954 |